US006857808B1

(12) United States Patent
Sugimoto et al.

(10) Patent No.: US 6,857,808 B1
(45) Date of Patent: Feb. 22, 2005

(54) JOINING STRUCTURE

(75) Inventors: Masakazu Sugimoto, Futtsu (JP); Masayuki Okimoto, Tokyo (JP); Tetsumi Kondo, Tokyo (JP); Shiro Kita, Tokyo (JP); Masafumi Higasa, Osaka (JP)

(73) Assignees: Nippon Steel Corporation, Tokyo (JP); Yoshimoto Pole Co., Ltd., Tokyo (JP); Inaba Electric Work, Osaka (JP)

( * ) Notice: Subject to any disclaimer, the term of this patent is extended or adjusted under 35 U.S.C. 154(b) by 0 days.

(21) Appl. No.: 10/070,353

(22) PCT Filed: Aug. 25, 2000

(86) PCT No.: PCT/JP00/05774

§ 371 (c)(1),
(2), (4) Date: Feb. 25, 2002

(87) PCT Pub. No.: WO01/16438

PCT Pub. Date: Mar. 8, 2001

(30) Foreign Application Priority Data

Aug. 26, 1999 (JP) ............................................ 11-239894
Jun. 9, 2000 (JP) ...................................... 2000-173592

(51) Int. Cl.$^7$ ............................. F16B 9/00; E02D 27/42
(52) U.S. Cl. ........................... 403/41; 403/42; 403/230; 403/335; 52/170; 52/296; 248/903
(58) Field of Search ............................ 403/41, 42, 230, 403/282, 286, 293, 300, 335–338, 382, 403, 408.1; 52/296, 726.1, 726.2, 726.3; 248/519, 539, 903; 285/133.5, 189, 368, 412; 138/106, 155, 172, DIG. 8

(56) References Cited

U.S. PATENT DOCUMENTS 943,747 A * 12/1909 Hickman ................ 248/539 X
1,539,580 A * 5/1925 Lally 2,146,333 A * 2/1939 Deming (List continued on next page.)

FOREIGN PATENT DOCUMENTS

| JP | 49-31212 | 4/1974 |
| JP | 50-77653 | 7/1975 |
| JP | 54-181706 | 6/1979 |
| JP | 57-129804 | 2/1981 |
| JP | 59-11987 | 1/1984 |

(List continued on next page.)

OTHER PUBLICATIONS

JP Publication No. 11117245, Apr. 27, 1999, Patent Abstracts of Japan.

*Primary Examiner*—John R. Cottingham
*Assistant Examiner*—Ryan M. Flandro
(74) *Attorney, Agent, or Firm*—Kenyon & Kenyon

(57) ABSTRACT

The present invention provides a joining structure capable of greatly improving the proof stress and the fatigue property by alleviating the stress concentration and residual stress caused by welding heat at one or both ends of a tabular member.

In the present invention, one or both ends 4 of a tabular member 3 such as a reinforcing rib, fixed to the surface of a structural member 1 in the direction of the principal stress of the structural member 1 so as to protrude in the shape of T, is/are bent in a direction deviating from the direction of the principal stress and, by this, the rigidity at the end(s) 4 of the tabular member 3 decreases and the stress concentration is alleviated. It is preferable to bend one or both ends of a tabular member 3 in the shape of an gradual curve and to the extent that each bent end is formed at a right angle to the direction of the principal stress. The tabular member may have the shape of a flat plate, or it may be bent so that it has the shape of U or V as a whole. Further, the tabular member may be welded to a structural member or formed as an integral part of a structural member.

6 Claims, 33 Drawing Sheets

U.S. PATENT DOCUMENTS

| | | | |
|---|---|---|---|
| 2,217,055 A | * 10/1940 | Jennens | 403/403 X |
| 3,113,760 A | 12/1963 | Huret et al. | |
| 3,436,102 A | * 4/1969 | Shelly | |
| 3,525,495 A | * 8/1970 | Brosseau | 403/230 X |
| 3,811,785 A | * 5/1974 | Hagglund | 403/408.1 X |
| 4,602,463 A | 7/1986 | Holowatyj | |
| 4,825,621 A | * 5/1989 | Jensen | |
| 5,004,366 A | * 4/1991 | Simmons | |
| 5,205,529 A | * 4/1993 | Killian | |
| 5,467,570 A | * 11/1995 | Leek | |
| 5,481,835 A | * 1/1996 | Bloom | 403/338 X |
| 5,626,434 A | * 5/1997 | Cook | |
| 5,752,781 A | * 5/1998 | Haataja et al. | 403/300 X |
| 5,979,130 A | * 11/1999 | Gregg et al. | |
| 6,032,425 A | * 3/2000 | Gugliotti et al. | 403/335 X |
| 6,073,405 A | * 6/2000 | Kasai et al. | |
| 6,324,800 B1 | * 12/2001 | Valentz et al. | 248/519 X |
| 6,427,393 B1 | * 8/2002 | Chen et al. | |

FOREIGN PATENT DOCUMENTS

| | | |
|---|---|---|
| JP | 62-135706 | 8/1987 |
| JP | 63-41607 | 3/1988 |
| JP | 6-17507 | 1/1994 |
| JP | 8-19861 | 1/1996 |
| JP | 8-144381 | 6/1996 |
| JP | 9-268653 | 10/1997 |

* cited by examiner

JOINING STRUCTURE

TECHNICAL FIELD

The present invention relates to a joining structure constructed by attaching one or more tabular members, such as reinforcing ribs, etc. or anchor bolts, to a structural member which takes various forms.

BACKGROUND ART

A joining structure, as shown in FIG. 22 or 23, has been conventionally used for a join, for instance, between a steel base structure and a foundation. The conventional joining structure is formed by welding a bolt connection base plate 11 to an end of a structural member 10 and reinforcing the joining structure with reinforcing ribs 12 attached between the structural member 10 and the base plate 11. The reinforcing ribs 12 are tabular members extending in the direction of the principal stress of the structural member 10 and are attached to protrude from the surface of the structural member 10 in the shape of a T.

In a conventional joining structure as described above, however, there is a problem that, when a bending moment is applied on the structural member 10, a large out-of-plane bending stress concentrates at the portions of the structural member 10 near the toes of the reinforcing ribs 12 and, as a consequence, the performance of the structure is deteriorated. Another problem is that, when the reinforcing ribs 12 are welded to the structural member 10, structural defects are likely to occur in the boxing welding portions at the upper ends of the reinforcing ribs 12 as a result of the combined effects of the residual stress caused by welding heat and the material degradation of the heat affected zones at the weld toes, causing the proof stress and the fatigue property to deteriorate. Those problems are common to many types of joining structures in which reinforcing ribs 12 are welded to structural members 10 in the form of T-joints and, in view of this, the Japanese Society of Steel Construction points out, in "Guideline for Fatigue Design of Steel Structures and Its Interpretation", that a join in which a gusset is welded by fillet welding or groove welding adversely affects the proof stress and fatigue property of a steel member and, therefore, attention has to be paid to this in the design of structures.

DISCLOSURE OF THE INVENTION

The present invention provides a joining structure composed of a structural member and one or more tabular members, or a structural member and anchor bolts, which joining structure can: solve the above-mentioned conventional problems; significantly alleviate the stress concentration at the toes of the tabular members such as the reinforcing ribs, etc.; greatly alleviate the residual stress caused by welding heat in the case of welding the tabular members; and, as a result, significantly improve the proof stress and the fatigue property compared with a conventional joining structure.

More specifically, the present invention is a joining structure having one or more tabular members protruding from the surface of a structural member and is characterized by bending one or both ends of each tabular member. Note that the above expression "one or both ends of each tabular member" means one or both end portions of each tabular member where the tabular member contacts with a structural member which is a base material. Further, in the present invention, it is preferable that the joining structure is a structure wherein a tabular member is a reinforcing rib protruding from the surface of a structural member in the shape of T so that the tabular member extends in the direction of the principal stress of the structural member and one or both ends of the reinforcing rib is/are bent in a direction deviating from the direction of said principal stress.

It has to be noted that it is preferable that one or both ends of a tabular member is/are bent in the shape of an gradual curve and to the extent that each bent end of the tabular member is formed at a right angle to the direction of the principal stress. Only one or both ends of a tabular member may be bent, or the whole body thereof may be bent in the shape of U or V.

The structural member may have a coupling flange or a base plate. In that case, a tabular member may be placed between the structural member and the coupling flange or between the structural member and the base plate, or otherwise may be used for fixing a join member, or yet may be used for fixing a secondary member.

Further, the present invention is applicable also to a type of joining structure wherein anchor bolts extending in the direction of the principal stress of a structural member are welded to the surface of the structural member and an end of each anchor bolt is bent in a direction deviating from the direction of the principal stress.

As described above, in the present invention, the rigidity at one or both ends of a tabular member decreases by bending the end(s) (toe(s)) of the tabular member such as a reinforcing rib, etc., preferably, in a direction deviating from the direction of the principal stress of a structural member. As a result, when a load is applied on the structural member, the stress concentration near the end(s) of the tabular member is significantly alleviated, and, when the tabular member is welded, the residual stress caused by welding heat near the end(s) of the tabular member is significantly alleviated as well. By this, the proof stress and the fatigue property of the joining structure is largely improved compared with a conventional joining structure. Specific numerical values are explained later.

BEST MODE FOR CARRYING OUT THE INVENTION

Preferred embodiments for carrying out the present invention are described hereafter.

(A Joint Structure of a Structural Member and a Coupling Flange)

Figure 1:
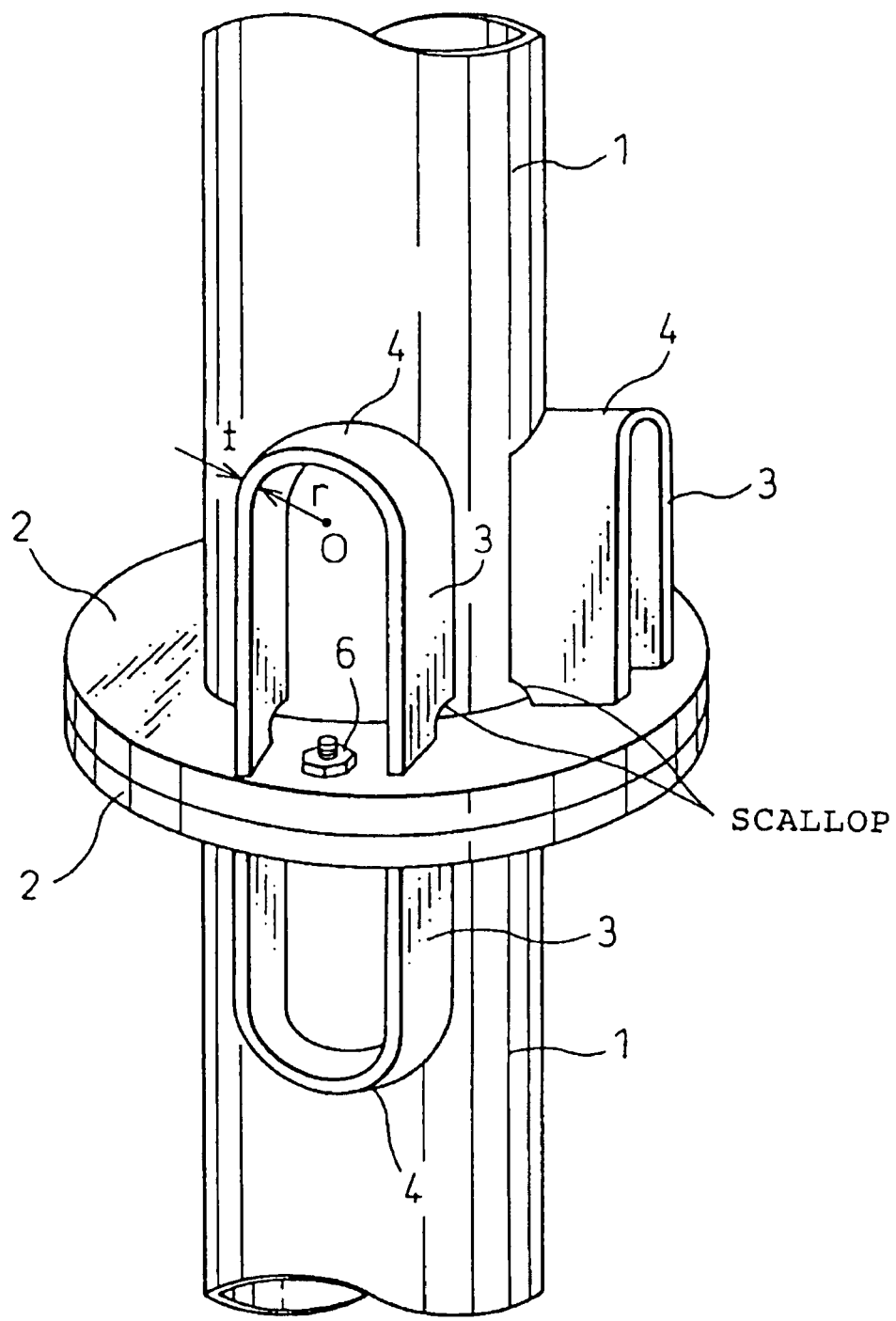
FIG. 1 is a perspective view showing a first embodiment of the present invention.

FIG. 1 is a perspective view showing a first embodiment of the present invention, wherein numerals indicate the following: 1 designates a structural member such as a steel pipe to be coupled to another; 2 a coupling flange welded to an end of the structural member 1 and used for bolt connection with another structural member; and 3 a reinforcing rib attached between the structural member 1 and the coupling flange 2 so as to protrude in the shape of T. In this case, the reinforcing ribs 3 are welded in the form of T-joints. The direction of the principal stress of the structural member 1 is the direction of the central axis of the structural member in FIG. 1. As seen in the figure, each of the reinforcing ribs 3 is bent in the shape of U, but it extends, as a whole, in the direction of the principal stress of the structural member 1. The end (toe) 4, which is located opposite the coupling flange, of a reinforcing rib 3 is bent in the shape of an gradual curve and to the extent that the bent end of the reinforcing rib is formed at a right angle to the direction of the principal stress.

The reinforcing ribs 3 are welded not only to the structural member 1 but also to the coupling flange 2, the welding to the coupling flange 2 being done by boxing welding. It is preferable to form a scallop at each of the inside corners of each reinforcing rib 3 to secure reliable welding work.

In the joining structure constructed as described above, as the end 4 of a reinforcing rib 3 is bent in a direction deviating from the direction of the principal stress of the structural member 1, the end 4 of a reinforcing rib 3 can be formed into a low rigidity structure. As a result, not only the stress concentration at the end 4 of a reinforcing rib 3 but also the residual stress caused by welding heat of the welded portion are significantly alleviated and, thus, the proof stress and the fatigue property of the joining structure are significantly improved.

To fully enjoy the above effect, it is desirable that the radius of curvature r of the end 4 of a reinforcing rib 3 is set at not less than 3 times its thickness t. If the radius of curvature r is smaller than 3 times of the thickness t, the material of the reinforcing rib 3 is likely to be deteriorated during bending the reinforcing rib 3 and, besides, the effect of lowering the rigidity decreases.

The coupling flanges 2 of the first embodiment are coupled to each other using bolts 6 in the same manner as in a conventional flange coupling method. While there is no specific restriction as to the number and positions of the bolts 6, when each of the bolts is located between the two legs of each of the reinforcing ribs 3 bent into the shape of U as shown in FIG. 1, there is the advantage that the bolts are protected from physical impact from the outside and from a corrosive environment. In any of the embodiments described hereinafter, the pipe constituting a structural member 1 is shown as a round steel pipe in any of relevant drawings, but it has to be noted that a square steel pipe may be used in place of the round pipe, or a section steel may be used as the structural member 1 as well.

(A Joining Structure of a Structural Member and a Base Plate)

Figure 2:
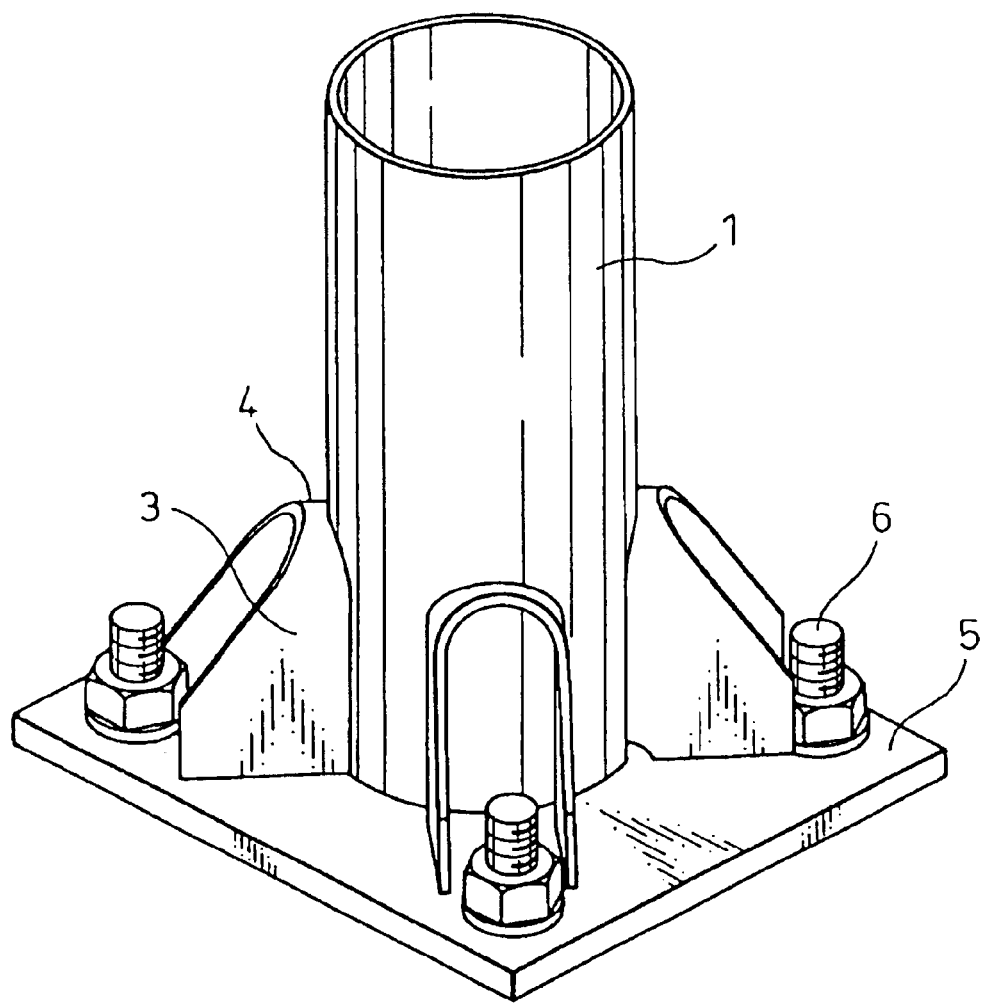
FIG. 2 is a perspective view showing a second embodiment of the present invention.

In the second embodiment shown in FIG. 2, the structural member 1 is a base structure consisting of a steel pipe, and numeral 5 indicates a base plate for fixing the structural member 1 to a foundation. Reinforcing ribs 3 bent into the shape of U are welded by T-joint weld between the structural member 1 and the base plate 5 so as to protrude in the shape of T, in the same manner as in the first embodiment. In the embodiment shown in FIG. 2, each of the reinforcing ribs 3 is cut slantwise so that its width becomes smaller towards the end 4, making the rigidity of the end 4 even smaller. Note that the position of each bolt 6 to fix the base plate 5 to a foundation may be outside the legs of each reinforcing rib 3, as seen in the third embodiment shown in FIG. 3.

Figure 4:
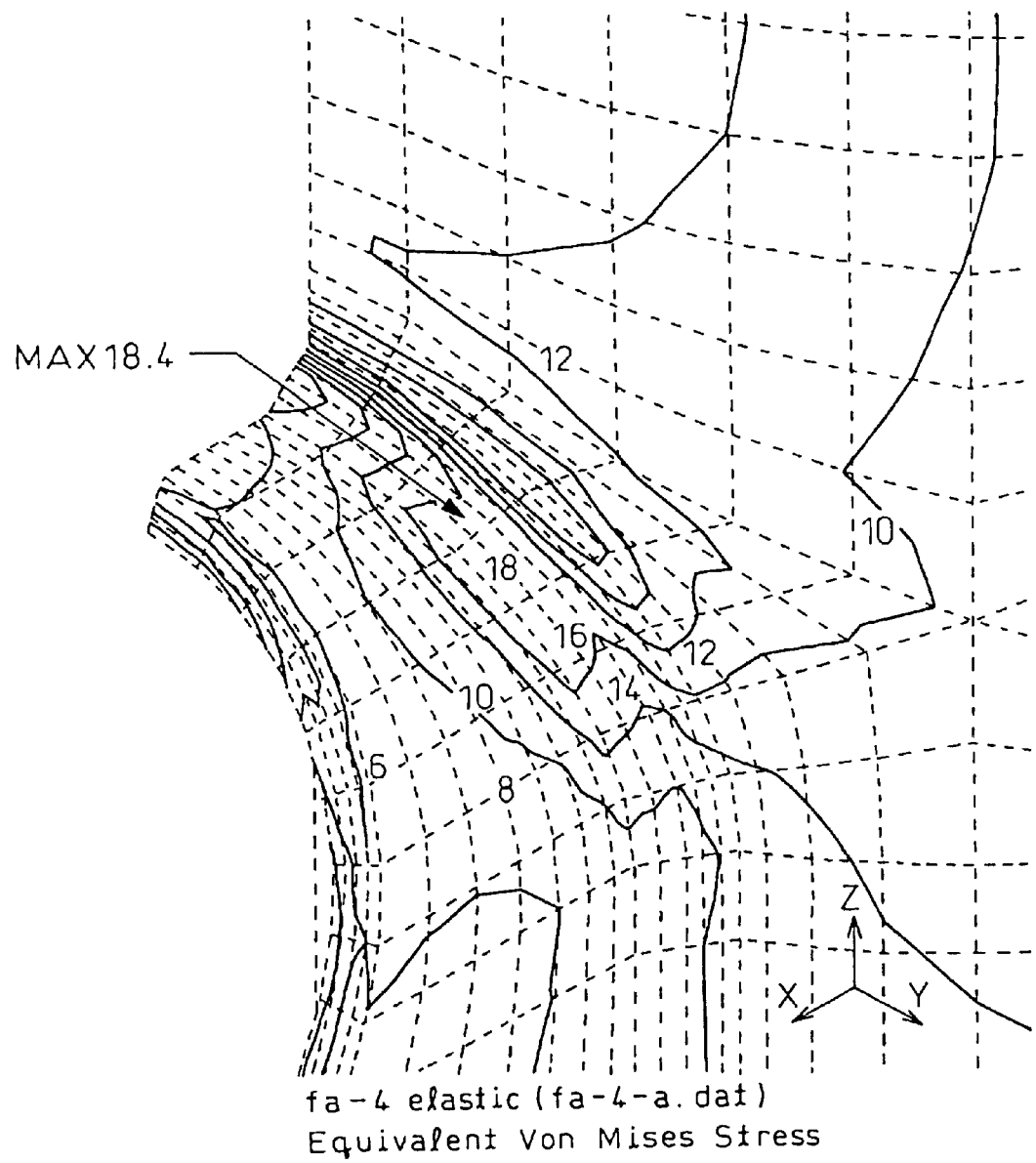
FIG. 4 is a stress concentration chart obtained through a finite element (FEM) analysis of the joint structure according to the second embodiment.
Figure 5:
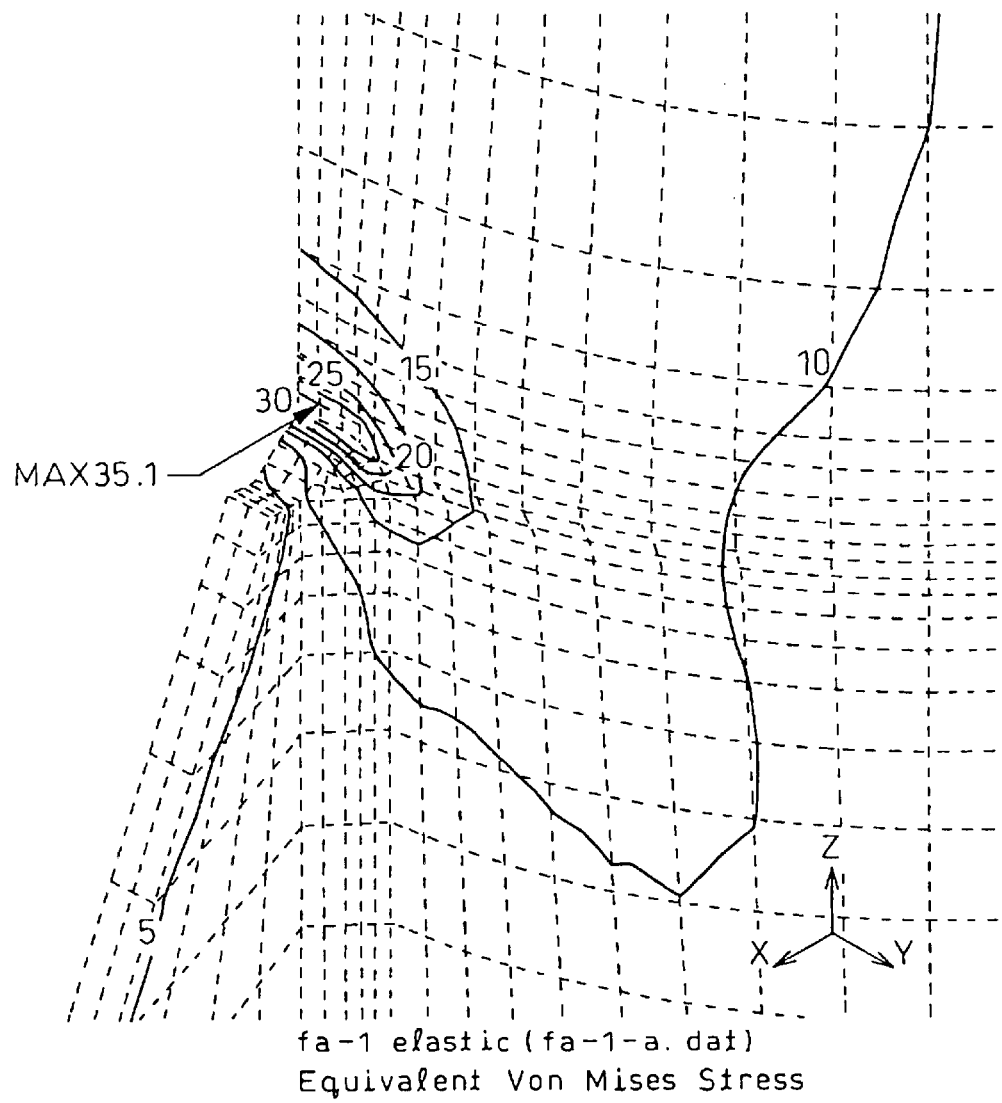
FIG. 5 is a stress concentration contour of a conventional joining structure having tabular reinforcing ribs.

A stress concentration contour obtained through afinite element (FEM) analysis of the joining structure according to the second embodiment is shown in FIG. 4 and another stress concentration contour of a conventional joining structure having tabular reinforcing ribs is shown in FIG. 5.

These figures show, in contour lines, the distribution of the stress forming around the reinforcing ribs 3 when horizontal loads of the same amount are applied to the upper ends of respective structural members 1, and the unit of the numerical figures in the charts is MPa. It is clear from the comparison of the charts that the stress concentration around the reinforcing rib 3 according to the present invention is significantly alleviated, compared with the case of the conventional technology.

Figure 3:
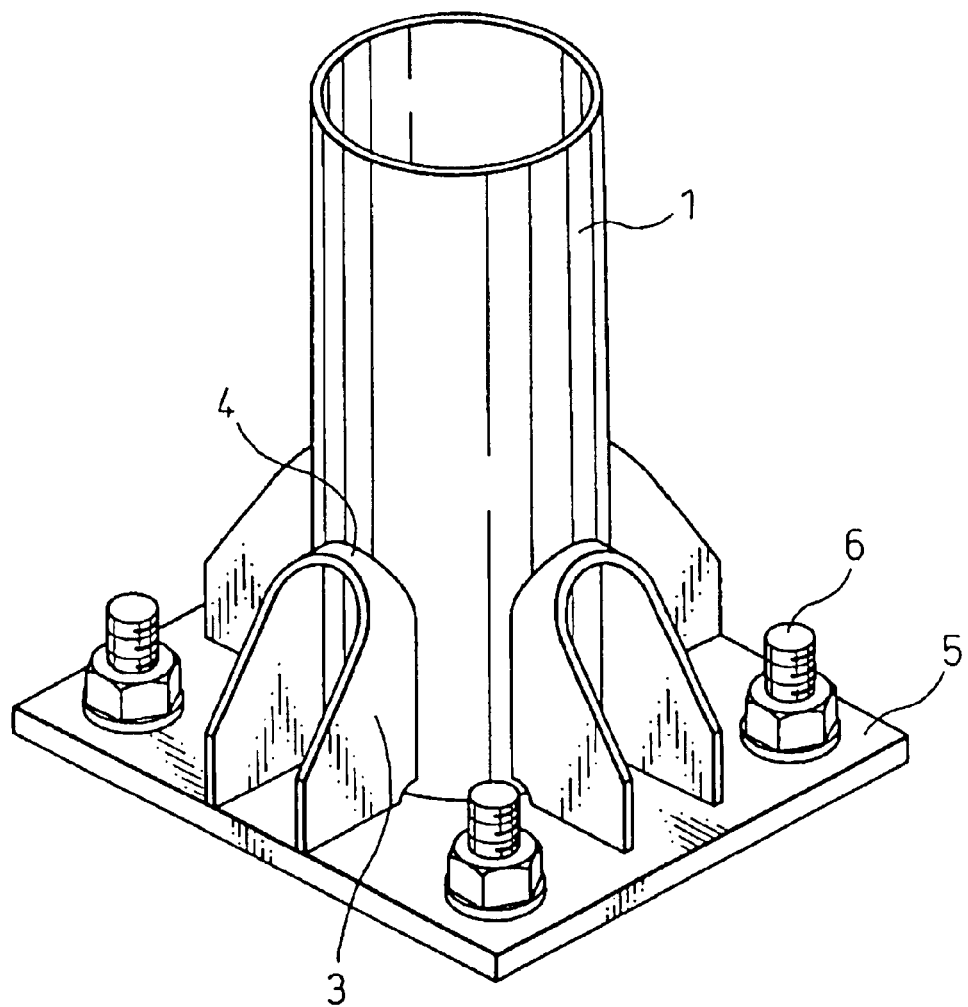
FIG. 3 is a perspective view showing a third embodiment of the present invention.
Figure 6:
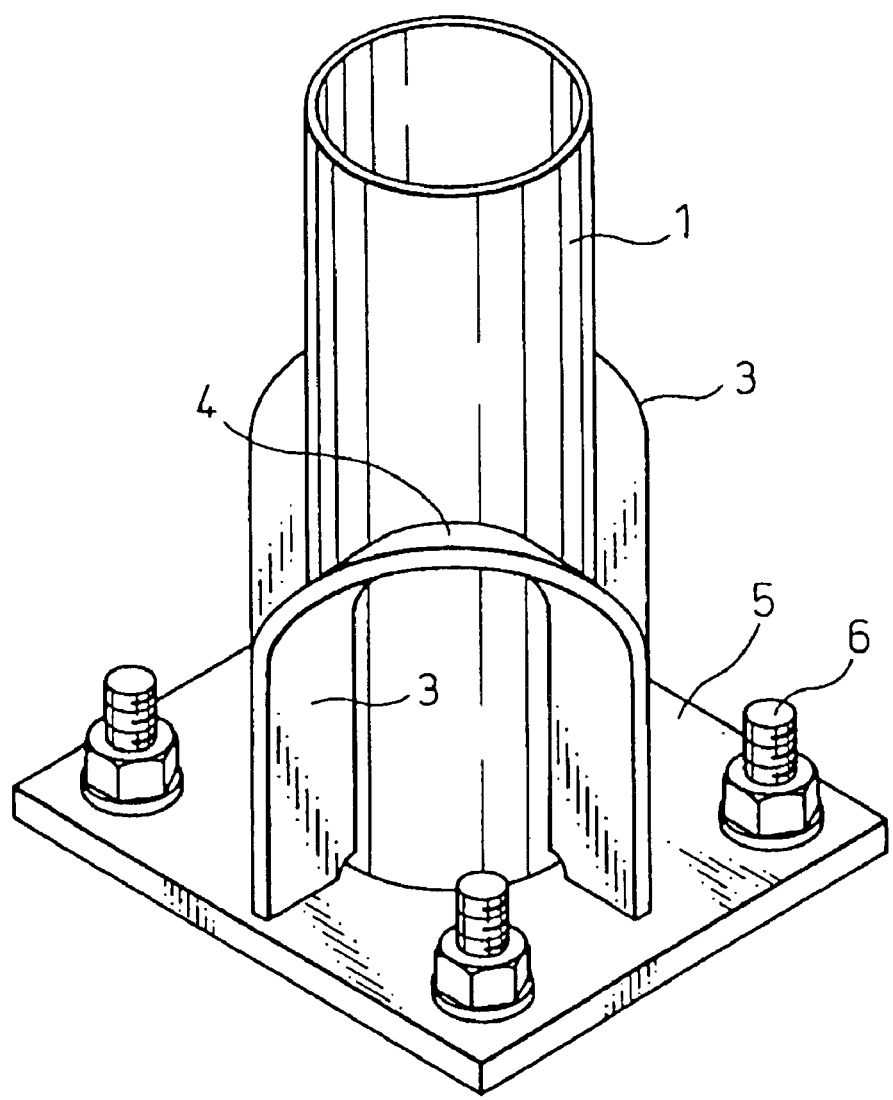
FIG. 6 is a perspective view showing a fourth embodiment of the present invention.

The fourth embodiment shown in FIG. 6 is a joining structure in which two adjacent reinforcing ribs 3 shown in FIG. 3 are connected into one piece. In this case too, the end 4 of a reinforcing rib 3 is bent to the extent that the bent end of the reinforcing rib 3 is formed at a right angle to the direction of the principal stress of the structural member 1 and, thus, the same effect as that of the other embodiments described above can be obtained.

Figure 7:
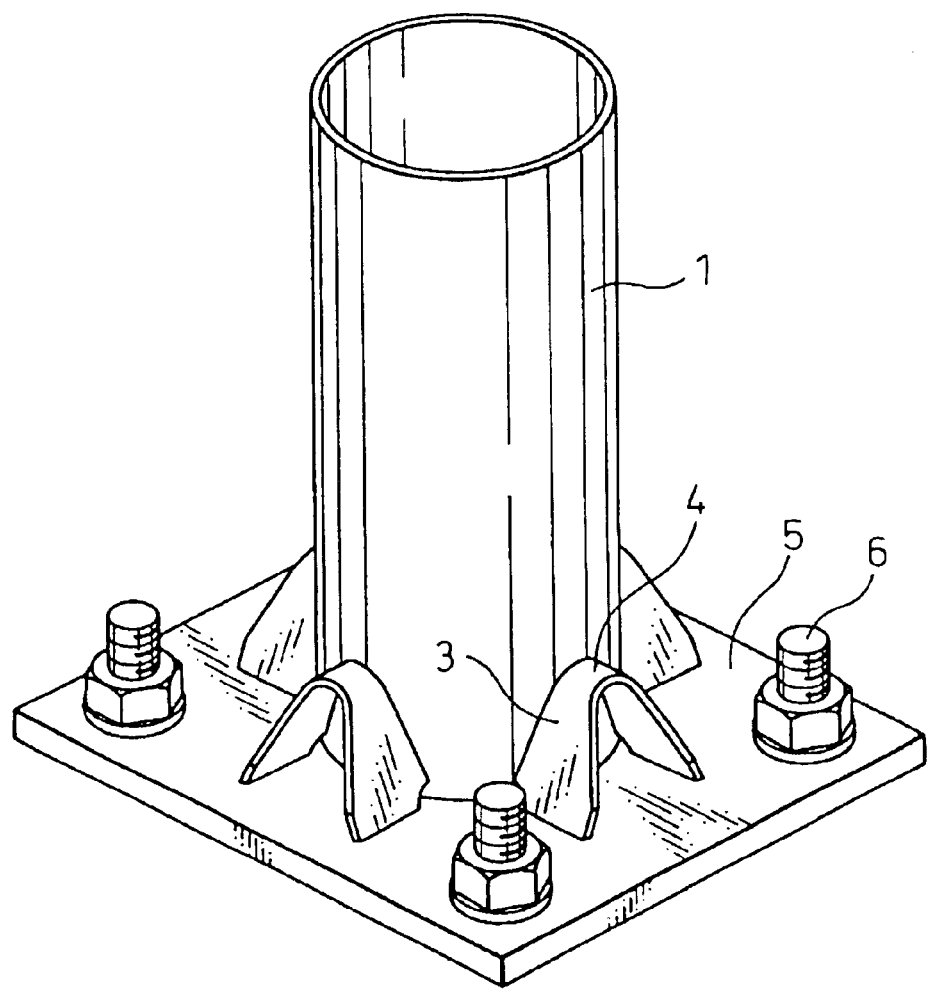
FIG. 7 is a perspective view showing a fifth embodiment of the present invention.

In the fifth embodiment shown in FIG. 7, the reinforcing ribs 3 disposed between the structural member 1 and the base plate 5 are formed into the shape of V. The legs of each reinforcing rib 3 slightly incline with respect to the direction of the principal stress of the structural member 1, but the centerline of the whole reinforcing rib 3 extends in the direction of the principal stress. The other structure and its functional effects are the same as the other embodiments described before.

Figure 8:
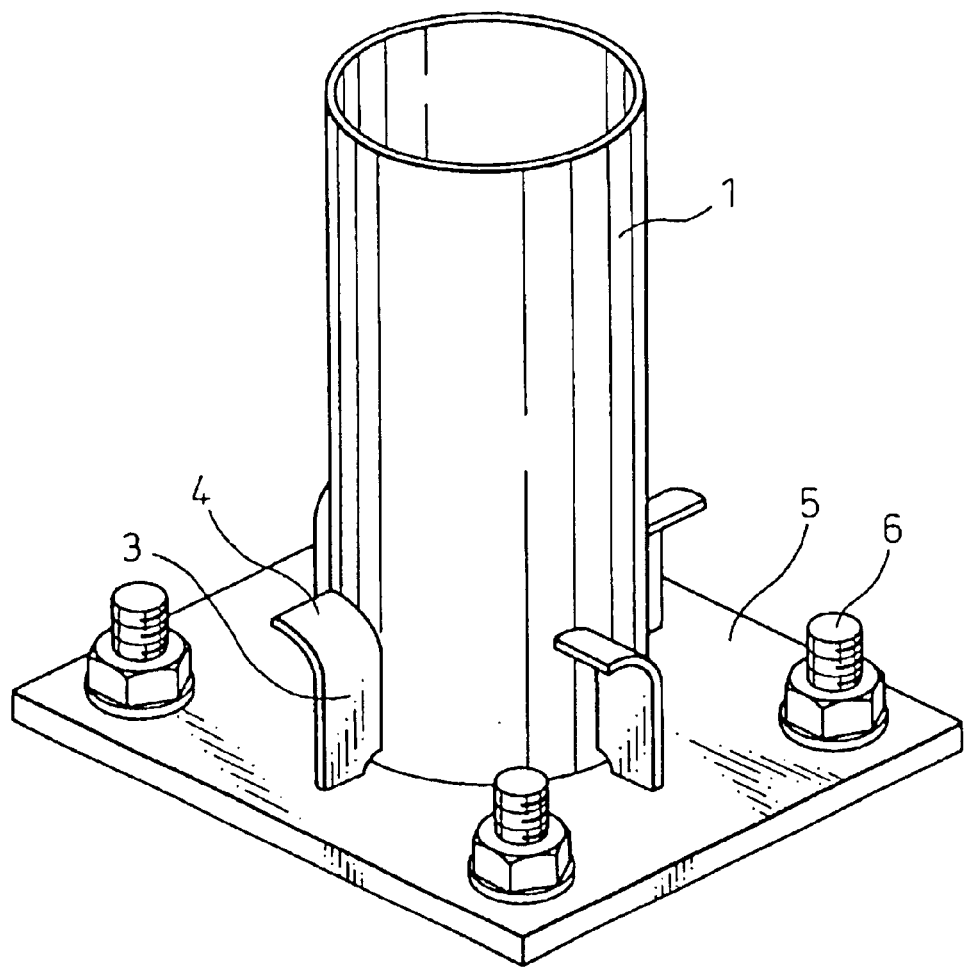
FIG. 8 is a perspective view showing a sixth embodiment of the present invention.

Whereas the reinforcing ribs 3 are bent into the shape of U or V in the embodiments described above, the top end of a tabular reinforcing rib 3 may be bent so as to deviate from the direction of the principal stress of the structural member 1 and to form the shape of an upside-down J, as seen in the sixth embodiment shown in FIG. 8. In a joining structure having this type of construction too, the rigidity at the end 4 of the reinforcing rib 3 is low against the principal stress of the structural member 1 and, therefore, the same effect as described before can be obtained.

Figure 9:
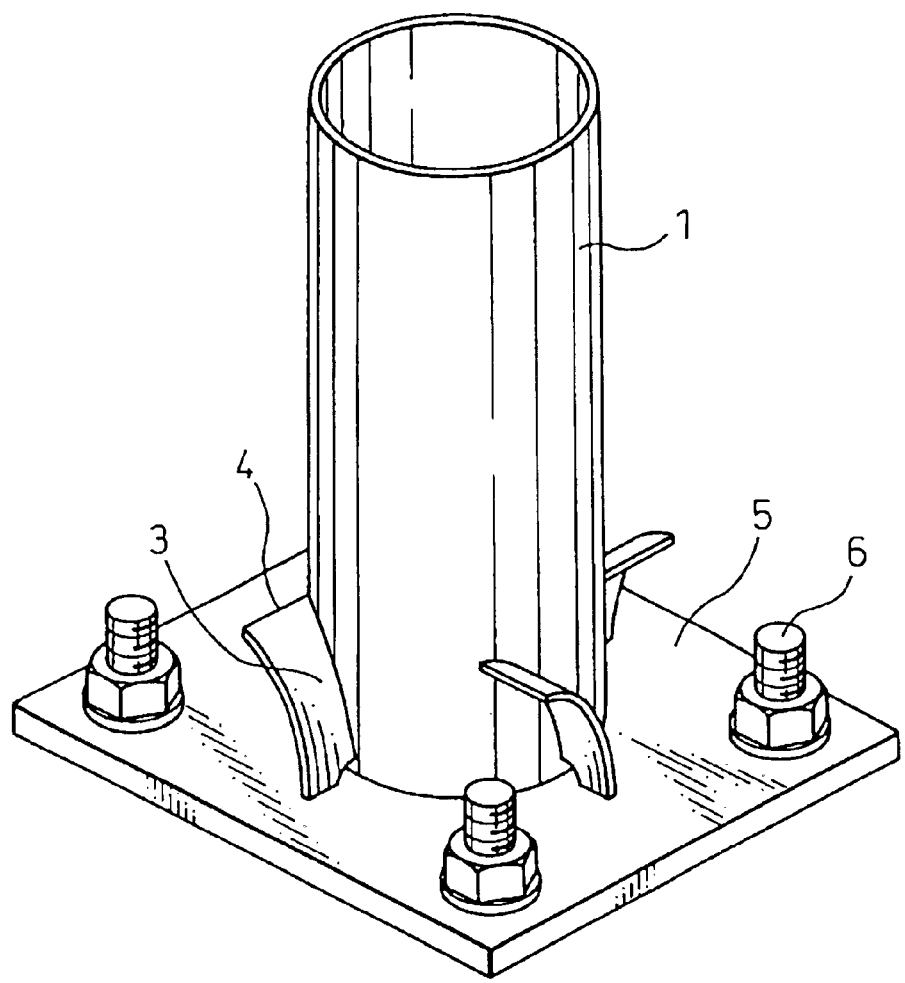
FIG. 9 is a perspective view showing a seventh embodiment of the present invention.
Figure 10:
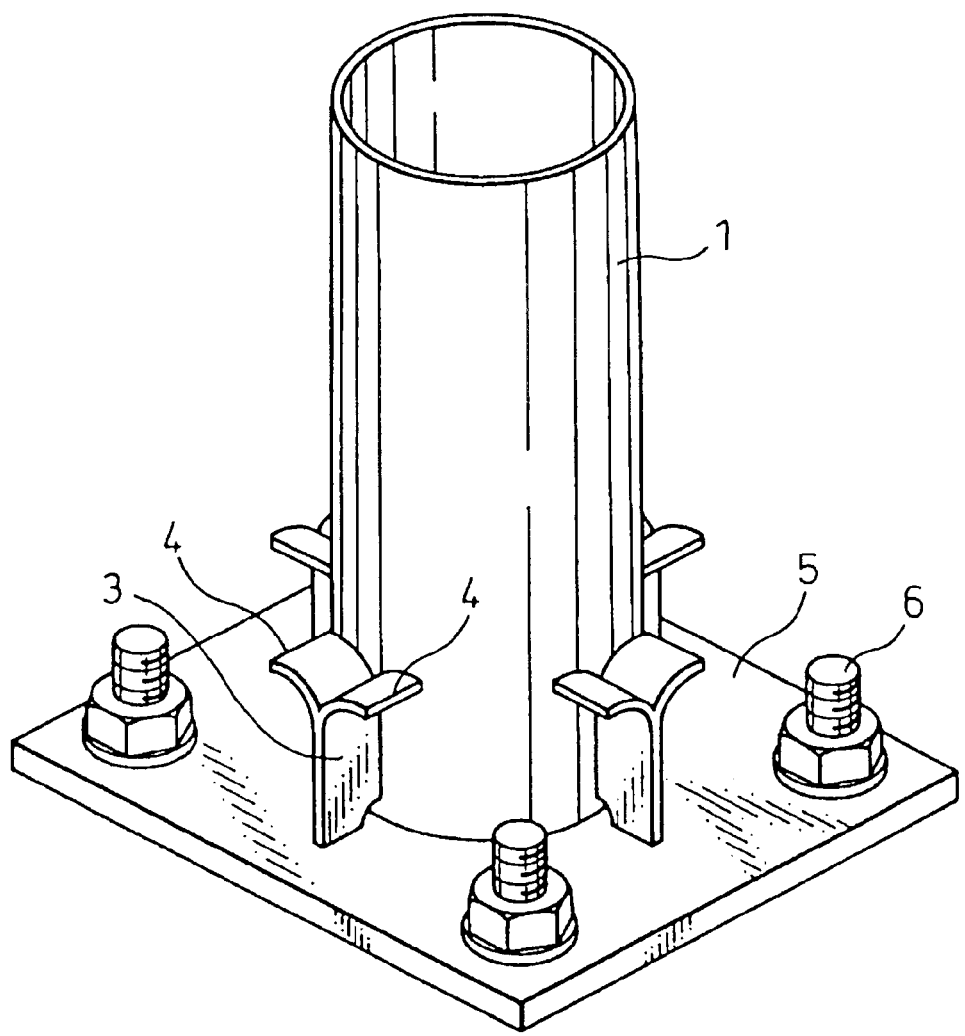
FIG. 10 is a perspective view showing an eighth embodiment of the present invention.

The whole body of a reinforcing rib 3 may incline as seen in the seventh embodiment shown in FIG. 9. In this case too, the end 4 of the reinforcing rib 3 may be bent significantly. In the eighth embodiment shown in FIG. 10, two reinforcing ribs 3 each having the shape of an upside-down J as shown in FIG. 8 are put together back-to-back to form a reinforcing rib 3 roughly in the shape of T.

Though it is preferable to bend the end 4 of the reinforcing rib 3 so as to form an gradual curve as shown in attached drawings, it is also possible to bend it linearly. The same effects as described before can be obtained also in that case since the end 4 of the reinforcing rib 3 has a low rigidity against the principal stress of the structural member 1. In view of the fact that another stress concentration occurs at the bend, however, it is preferable, as a conclusion, to bend the reinforcing rib 3 so as to form an gradual curve.

(A Joining Structure of a Structural Member and Reinforcing Ribs for Fixing Joining Members)

Figure 11:
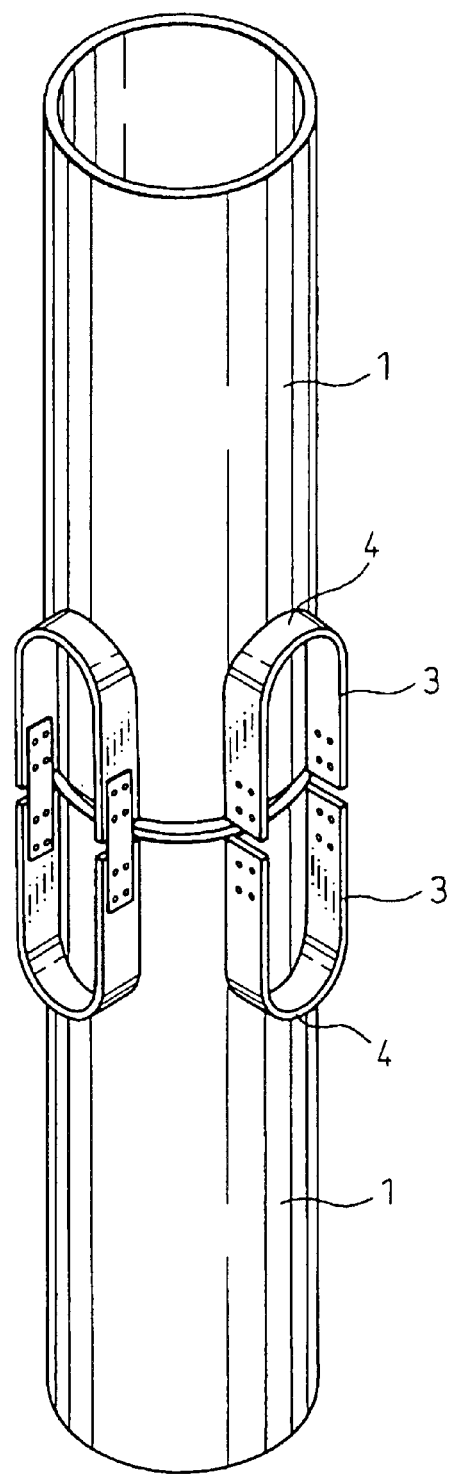
FIG. 11 is a perspective view showing a ninth embodiment of the present invention.
Figure 12:
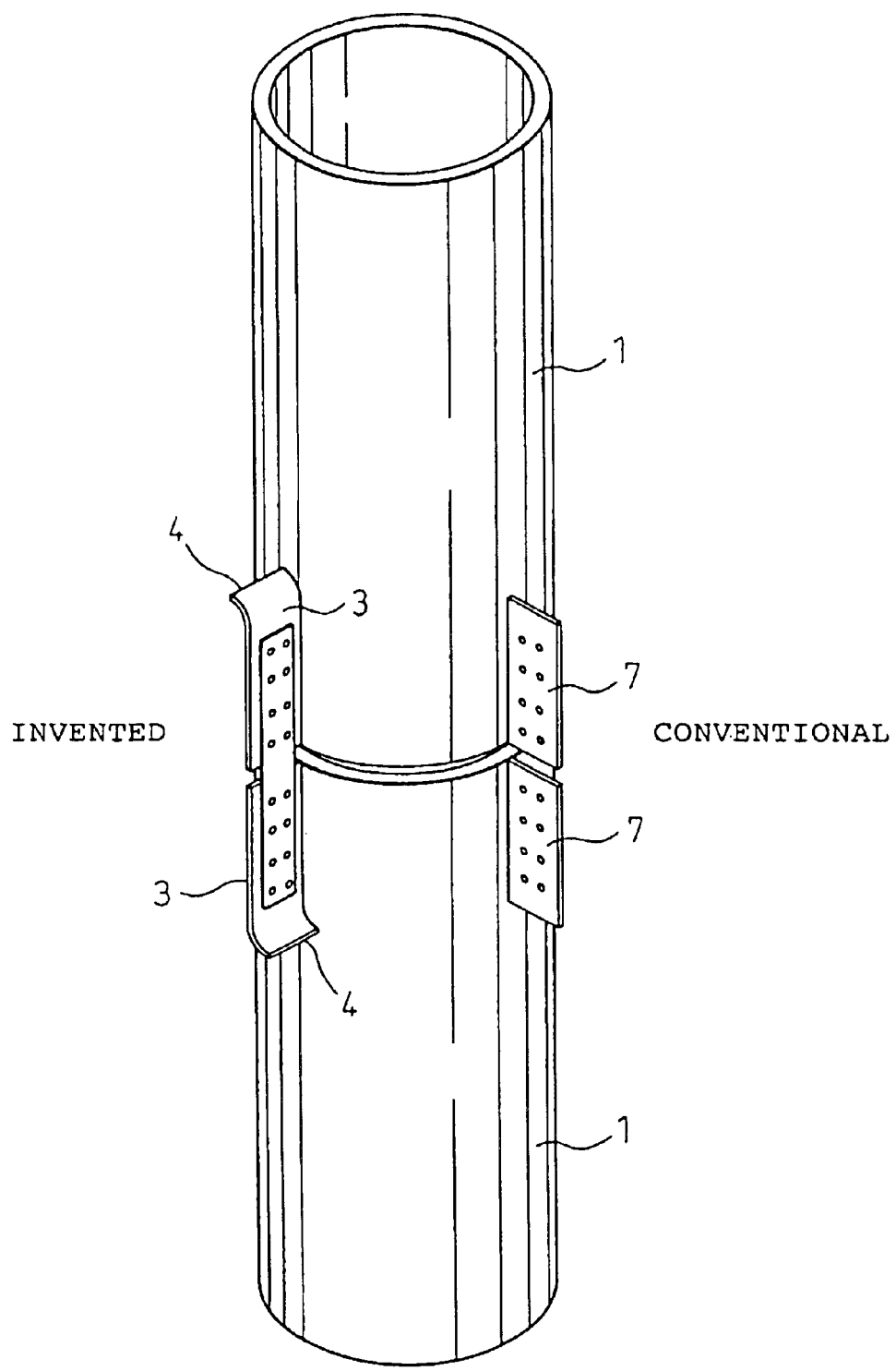
FIG. 12 is a perspective view showing a conventional joining structure corresponding to the ninth embodiment and a modified example of the ninth embodiment.

Whereas two structural members 1 (steel pipes) are coupled using coupling flanges 2 in the first embodiment shown in FIG. 1, the ninth embodiment shown in FIG. 11 represents a case where reinforcing ribs 3 are used as steel pipe joints. When this type of joining structure is employed, conventionally, a tabular steel pipe joint 7 as shown in the right-hand part of FIG. 12 is welded to an end of each steel pipe and the steel pipes are coupled using bolts or rivets, but the stress concentration does occur at the end of the steel pipe joint 7 also in this case. When each reinforcing rib 3 whose end 4 is bent as shown in FIG. 11 or the left-hand part of FIG. 12 is used, however, not only the stress concentration but also the residual stress caused by welding heat can be alleviated. FIG. 11 shows a case where reinforcing ribs 3 are bent into the shape of U, and the left-hand part of FIG. 12 shows another case where only the end 4 of each tabular reinforcing rib 3 is bent.

(A Joining Structure of a Structural Member and a Reinforcing Rib for Fixing a Secondary Member)

Figure 13:
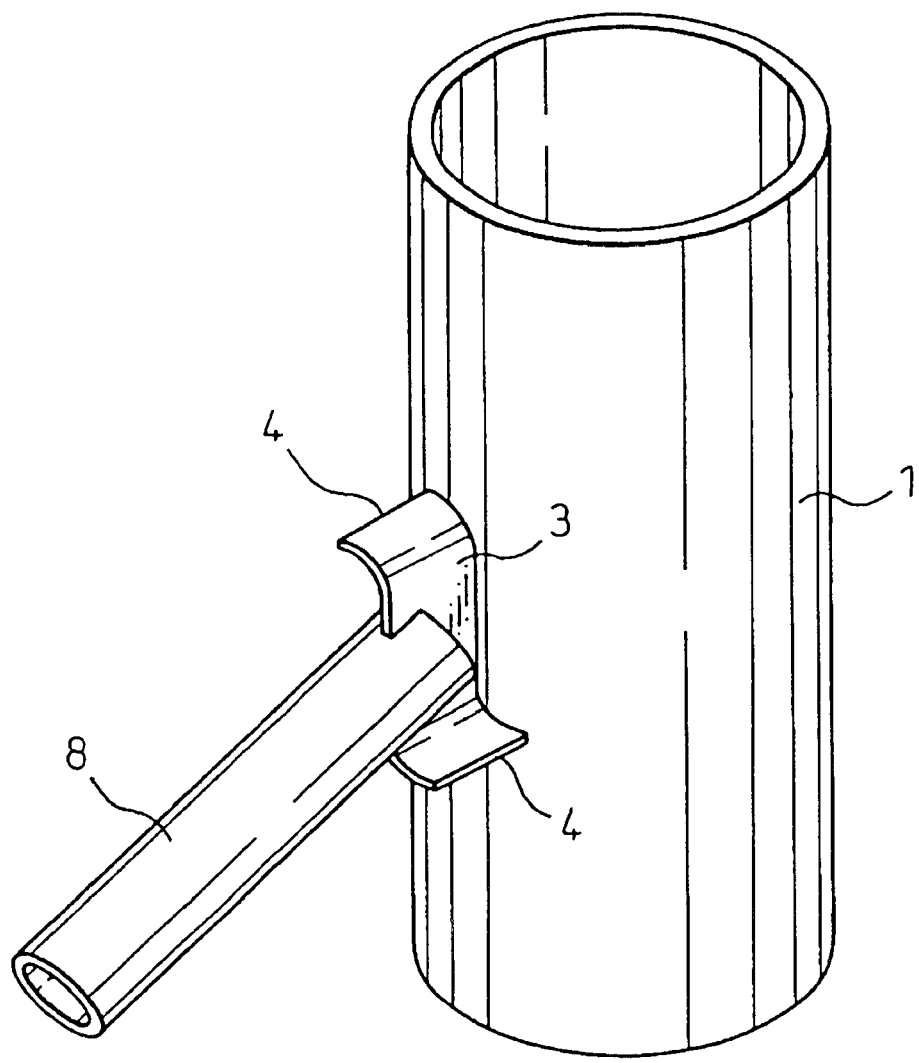
FIG. 13 is a perspective view showing a tenth embodiment of the present invention.
Figure 14:
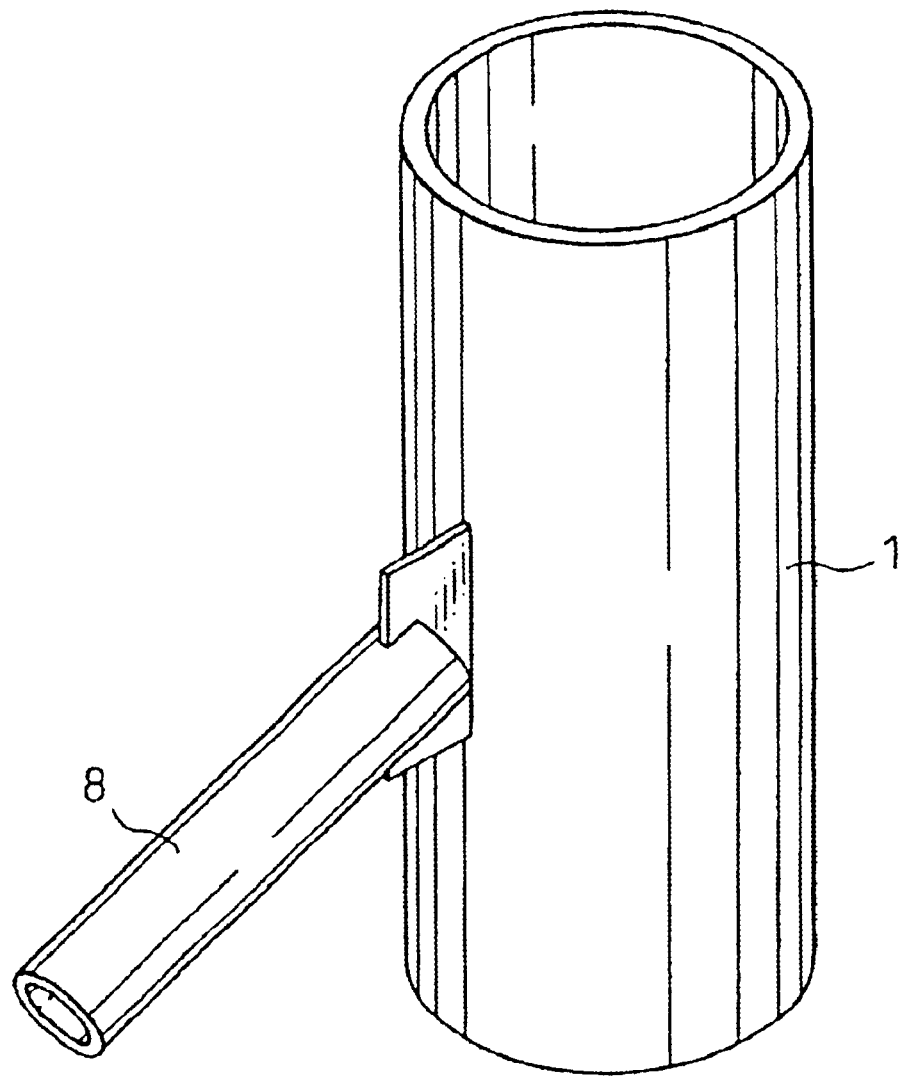
FIG. 14 is a perspective view showing a conventional joining structure corresponding to the tenth embodiment.

The tenth embodiment shown in FIG. 13 is a joining structure wherein a reinforcing rib 3 for fixing a secondary member 8 is welded in the shape of T to the side wall of a steel tube constituting a structural member 1. This reinforcing rib 3 also extends in the direction of the principal stress of the structural member 1 and the upper and lower ends of the reinforcing rib 3 are bent in directions deviating from the direction of the principal stress of the structural member 1. By this structure, as in the cases of the other embodiments, the stress concentration at the rib ends and also the residual stress caused by welding heat can be alleviated compared with the conventional structure shown in FIG. 14.

Figure 15:
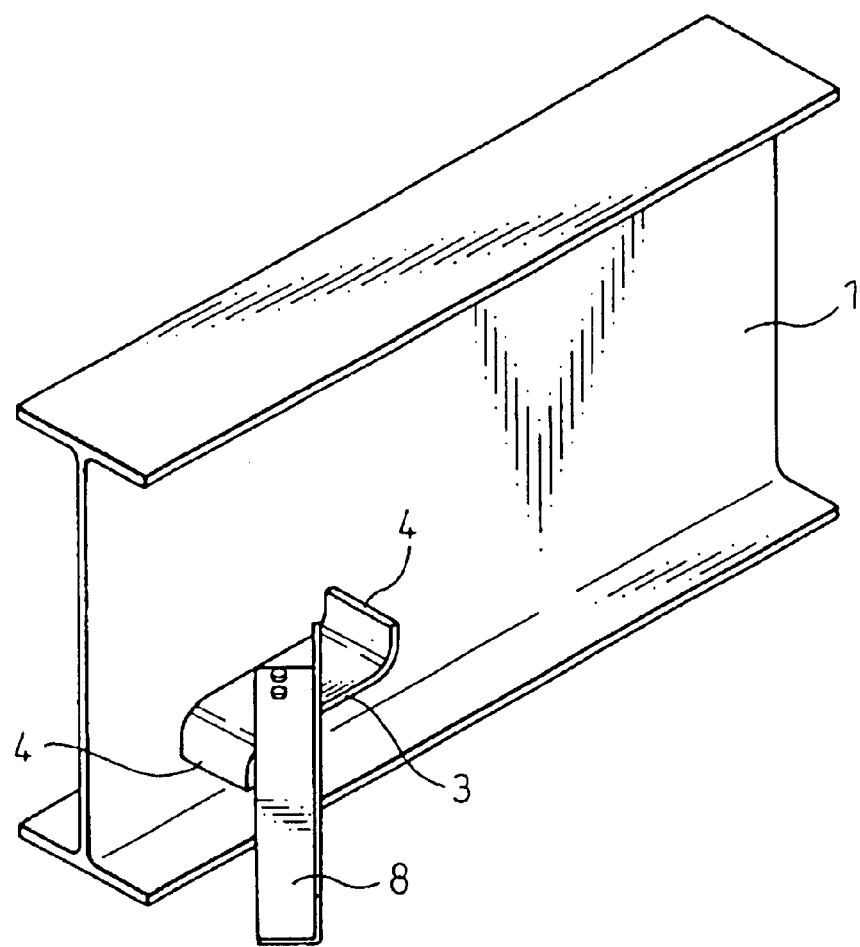
FIG. 15 is a perspective view showing an eleventh embodiment of the present invention.
Figure 16:
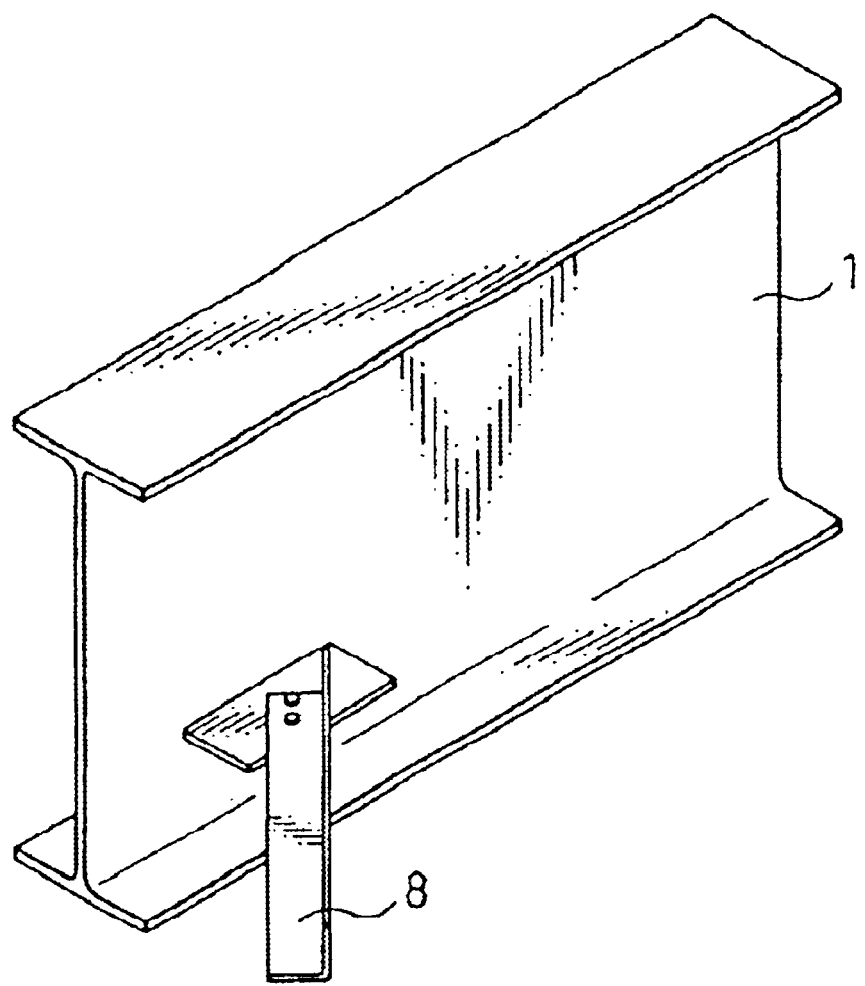
FIG. 16 is a perspective view showing a conventional joining structure corresponding to the eleventh embodiment.

The eleventh embodiment shown in FIG. 15 is a case where the present invention is applied to a gusset structure for a horizontal lateral bracing. In this case, the structural member 1 is an I-beam installed horizontally and the direction of its principal stress is horizontal. A reinforcing rib 3 whose both ends are bent is welded horizontally onto a side of the structural member 1 by T-joint weld, and a horizontally extending secondary member 8 is fixed to the reinforcing rib 3. FIG. 16 is a view showing a conventional gusset structure for a horizontal lateral bracing; the stress concentration at the ends of the reinforcing rib is large since the reinforcing rib used here is a flat plate. However, when the structure shown in FIG. 15 is employed, the stress concentration at the ends and also the residual stress caused by welding heat can be alleviated.

Figure 17:
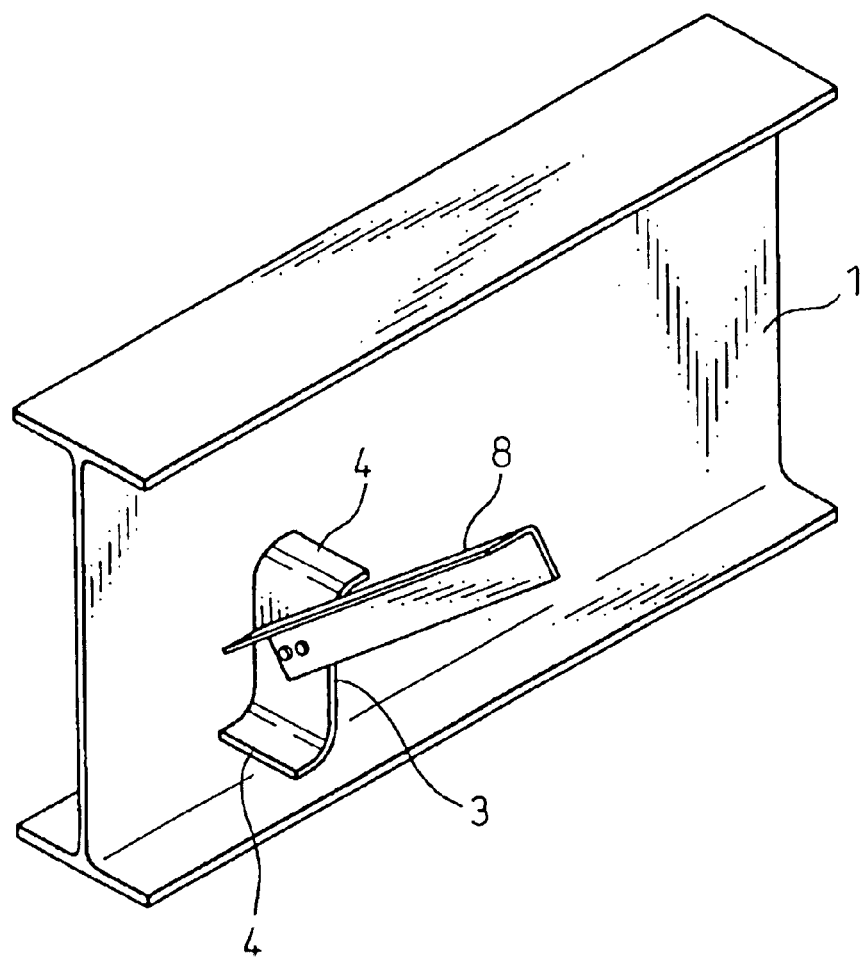
FIG. 17 is a perspective view showing a twelfth embodiment of the present invention.
Figure 18:
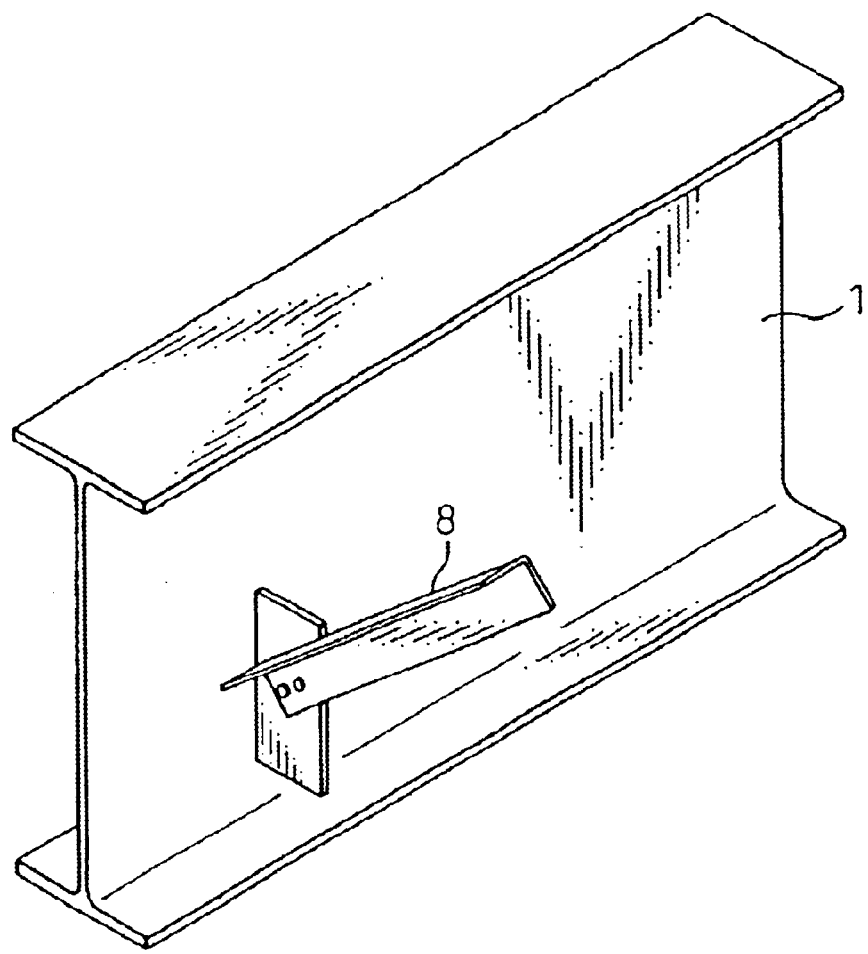
FIG. 18 is a perspective view showing a conventional joining structure corresponding to the twelfth embodiment.

The twelfth embodiment shown in FIG. 17 is a case where the present invention is applied to a gusset structure for a transverse bracing. In this case too, the structural member 1 is an I-beam installed horizontally, but the direction of its principal stress is vertical. A reinforcing rib 3 whose both ends are bent is welded vertically onto a side of the structural member 1 by T-joint weld, and a secondary member 8 extending aslant upward is fixed to the reinforcing rib 3. The stress concentration at the ends of the reinforcing rib 3 and the residual stress caused by welding heat are significantly alleviated compared with the conventional gusset structure for a transverse bracing shown in FIG. 18.

(A Joining Structure of a Structural Member and Anchor Bolts)

Figure 19:
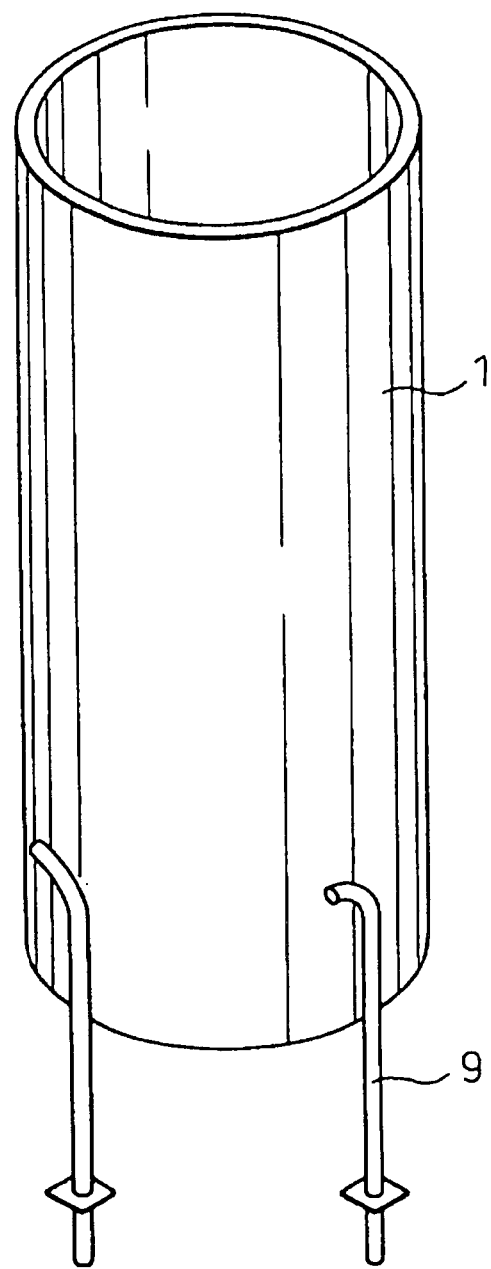
FIG. 19 is a perspective view showing a thirteenth embodiment of the present invention.
Figure 20:
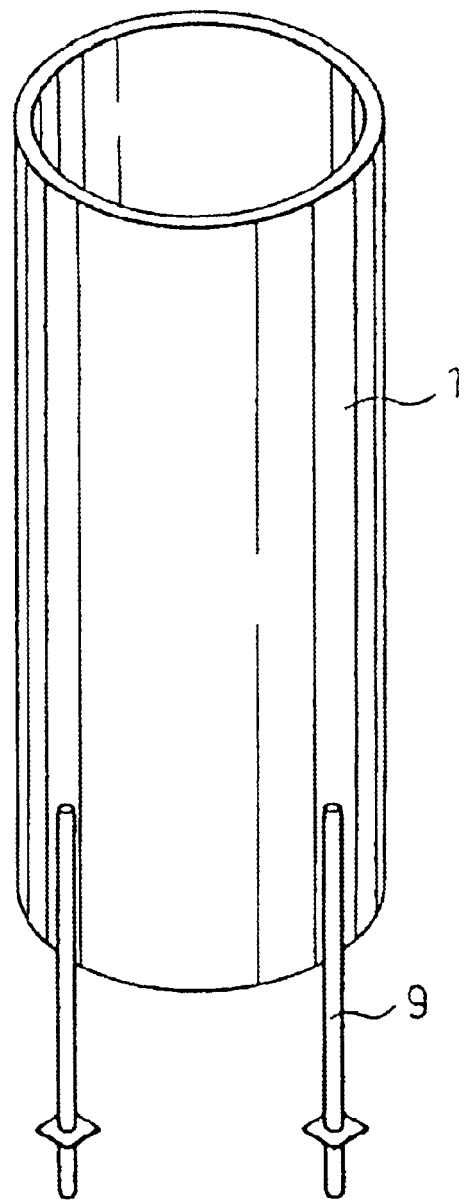
FIG. 20 is a perspective view showing a conventional joining structure corresponding to the thirteenth embodiment.

Whereas any of the joining structures heretofore described is a joining structure having a structural member 1 and one or more reinforcing ribs 3, the thirteenth embodiment shown in FIG. 19 is a structure wherein anchor bolts 9 are welded to an end of a structural member 1. In this case too, the anchor bolts 9 extend in the direction of the principal stress of the structural member 1. Whereas stress concentrates at the ends of the anchor bolts in the conventional anchoring structure shown in FIG. 20, when an end of each anchor bolt 9 is bent so as to deviate from the direction of the principal stress of the structural member 1 as seen in FIG. 19, not only the stress concentration is alleviated but also the residual stress caused by welding heat is significantly alleviated.

Figure 32:
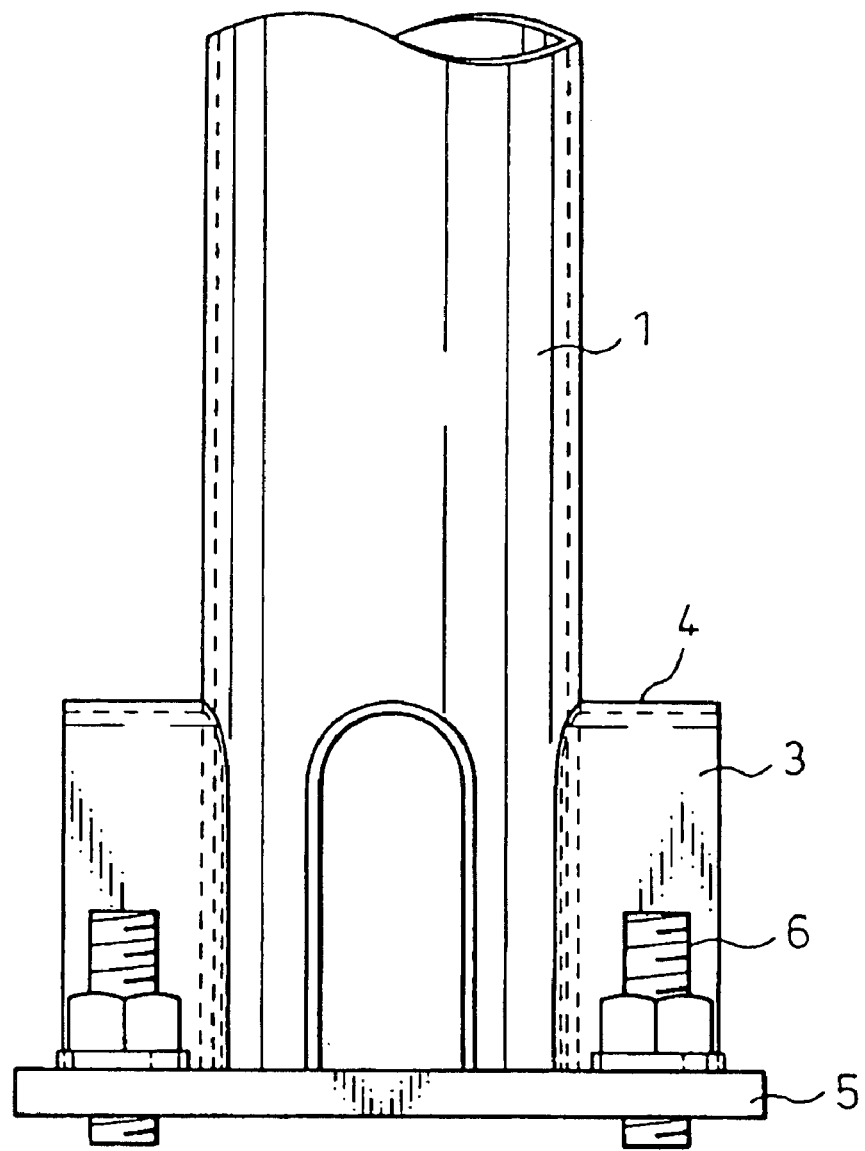
FIG. 32 is a front elevation view of a modified example of the joining structure shown in FIG. 2.
Figure 33:
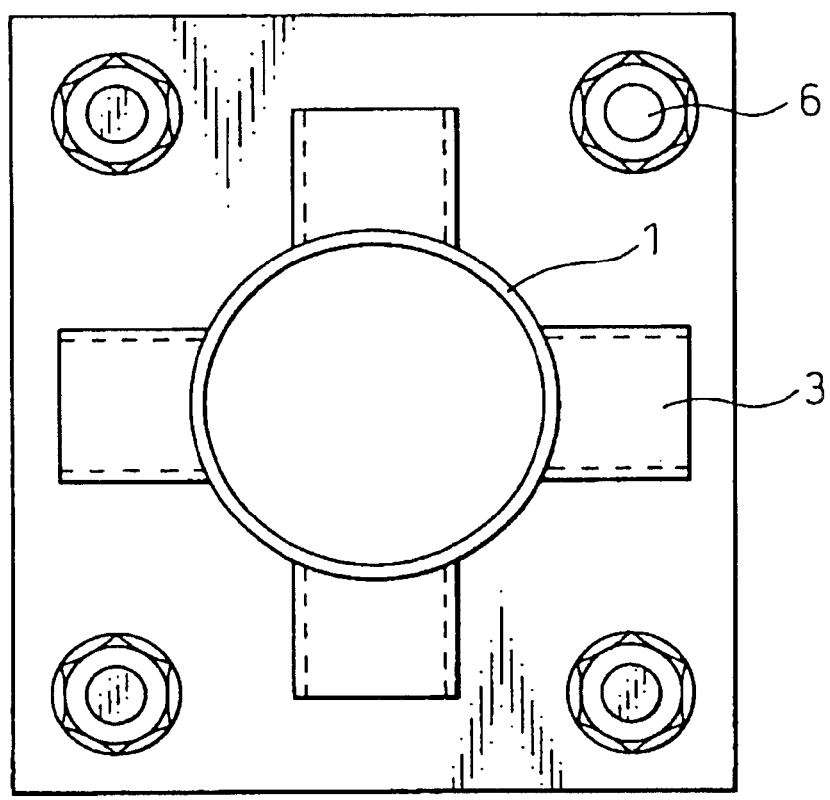
FIG. 33 is a plan view of the modified example of the joining structure shown in FIG. 2.

The front elevation views and plan views of the embodiments shown in FIGS. 3, 6, 7 and 8 described above are given in FIGS. 24 to 31. FIGS. 32 and 33 are the front elevation view and plan view, respectively, of a modified example of the embodiment shown in FIG. 2.

In the embodiments of the present invention described above, a tabular member is a reinforcing rib and is fixed by welding to a structural member so as to protrude from its surface but, needless to say, the formations are not necessarily restricted to those described above: it may be formed by any suitable method such as press work, cutting, etc.

EXAMPLE

A fatigue strength test was carried out for the purpose of confirming the effect of the present invention described above.

Figure 22:
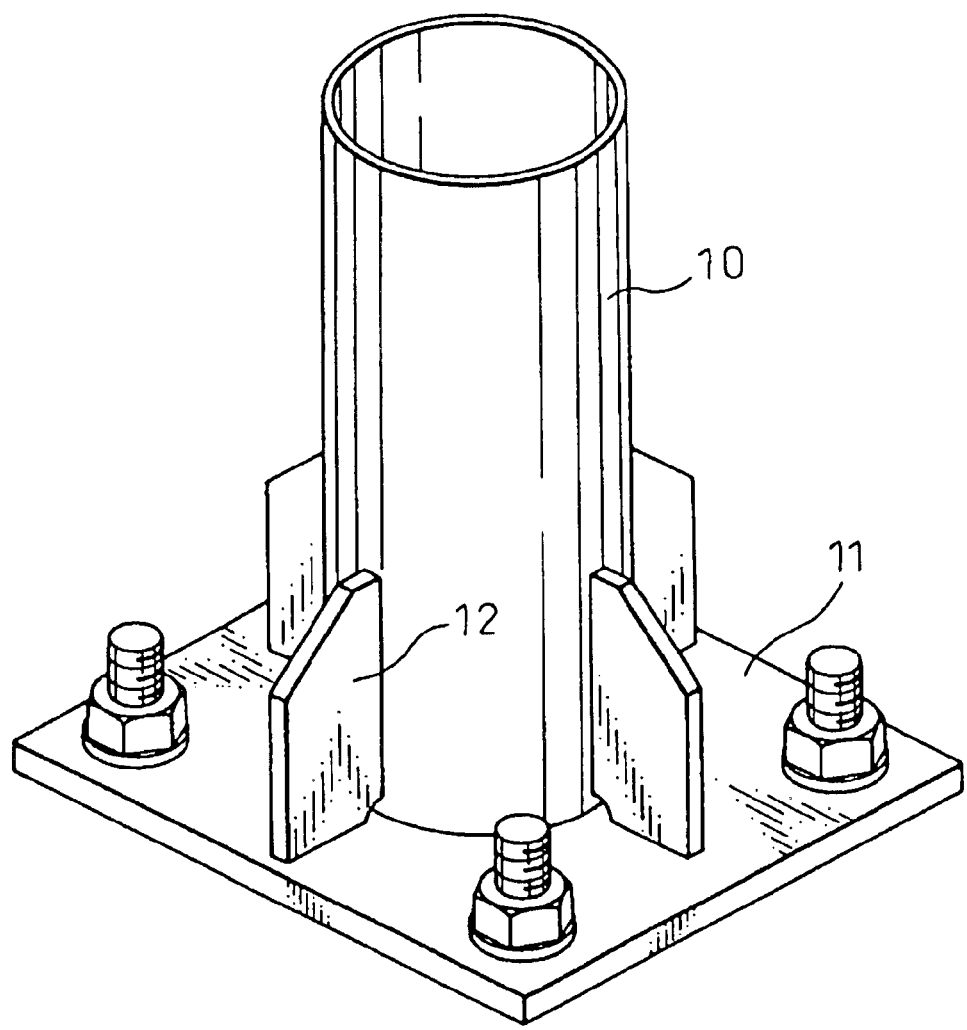
FIG. 22 is a perspective view showing a conventional joining structure.
Figure 23:
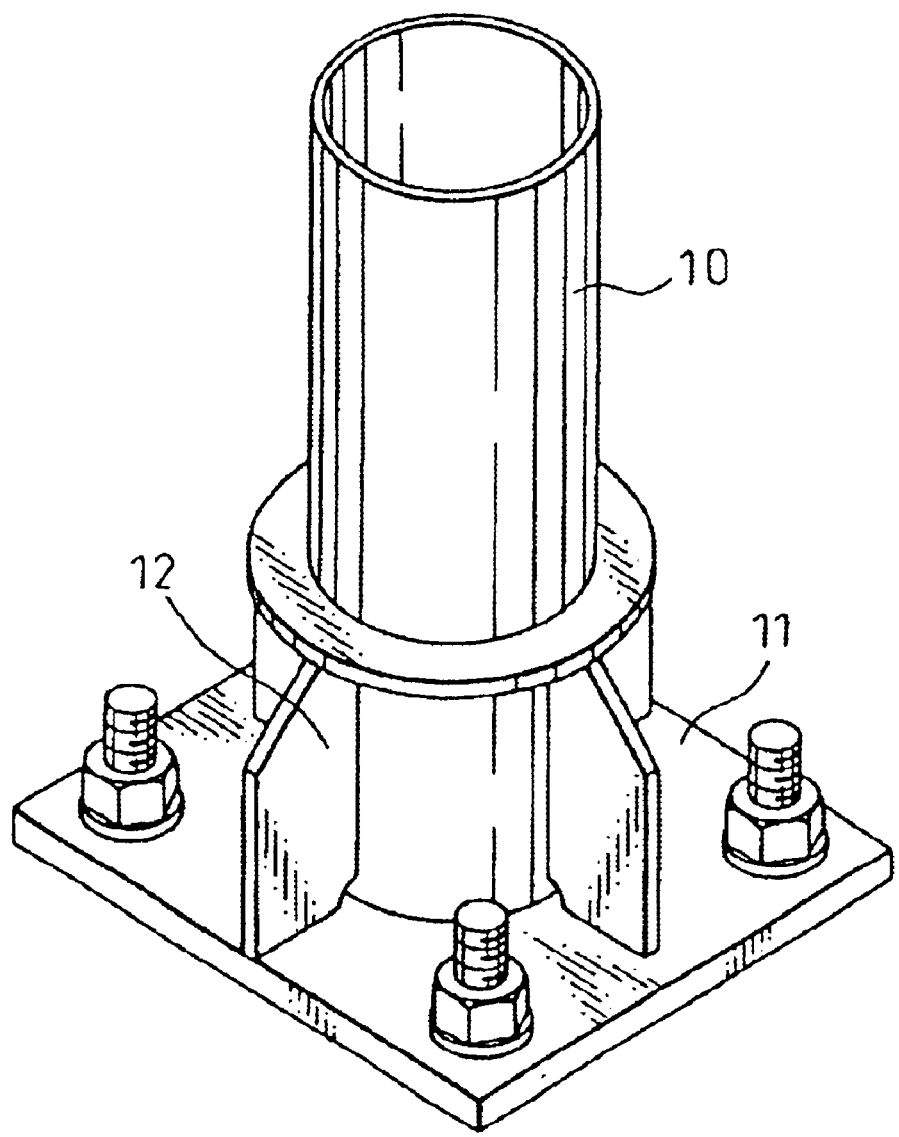
FIG. 23 is a perspective view showing another conventional joining structure.
Figure 24:
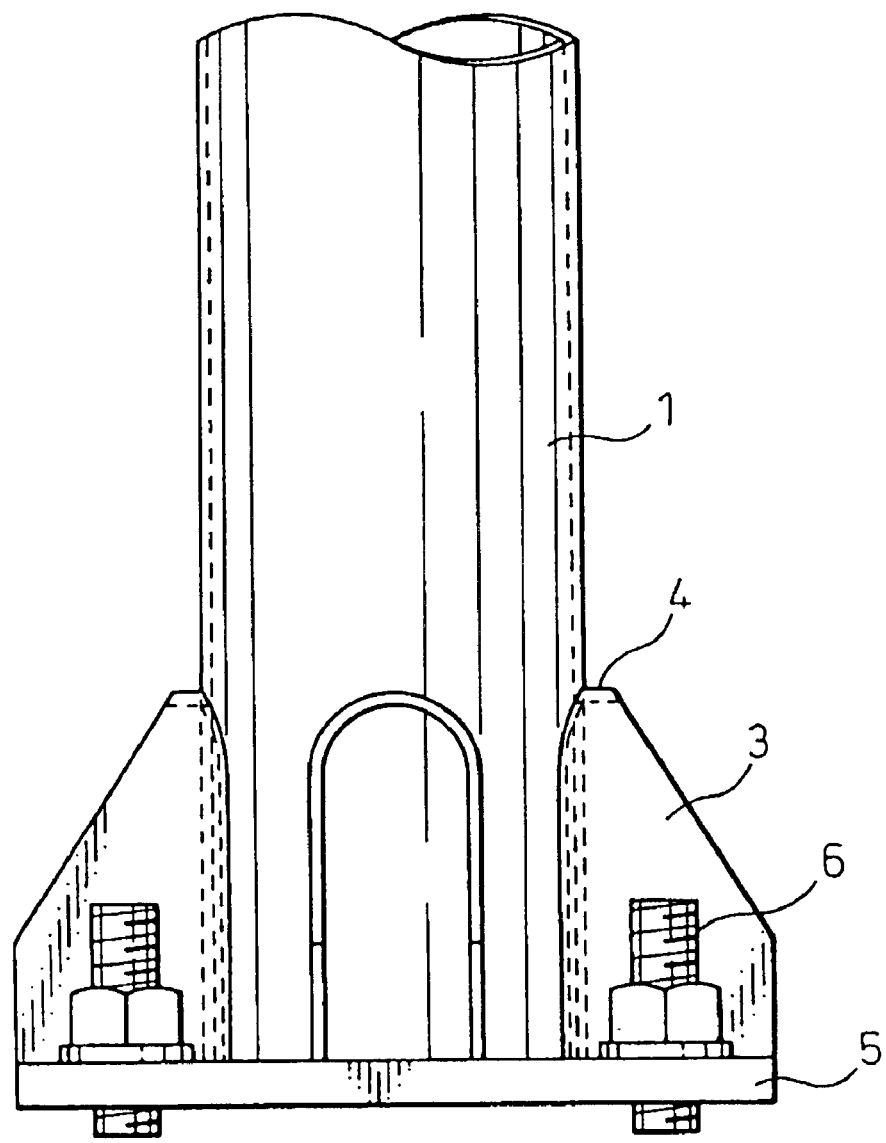
FIG. 24 is a front elevation view of the joining structure shown in FIG. 3.
Figure 25:
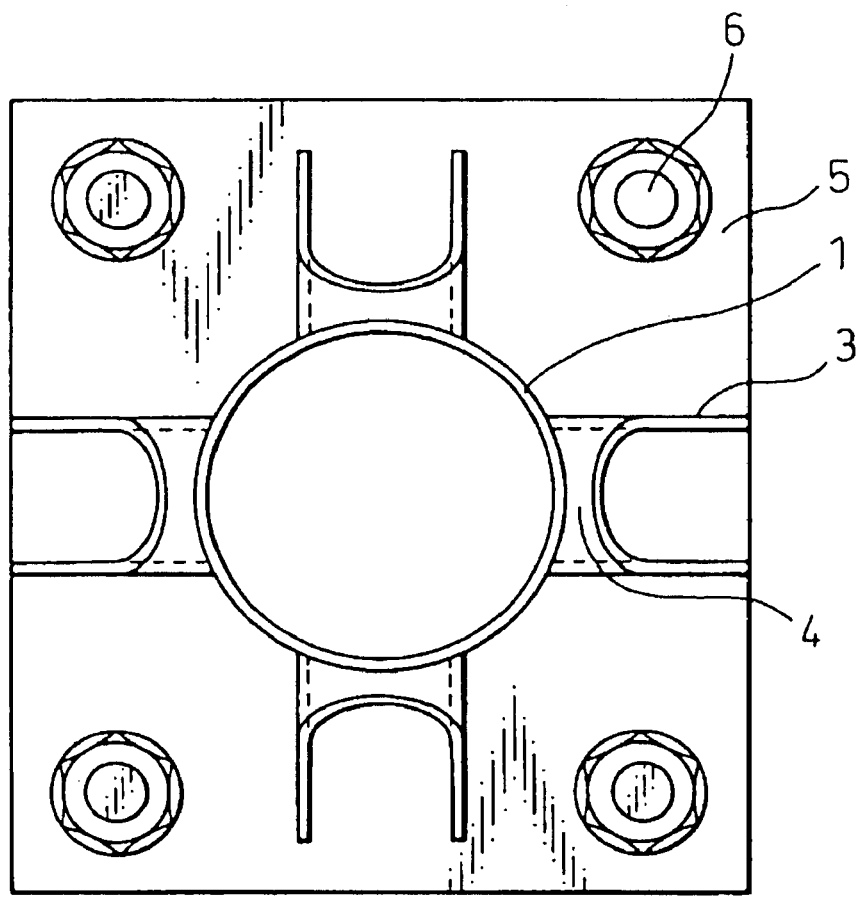
FIG. 25 is a plan view of the joining structure shown in FIG. 3.
Figure 26:
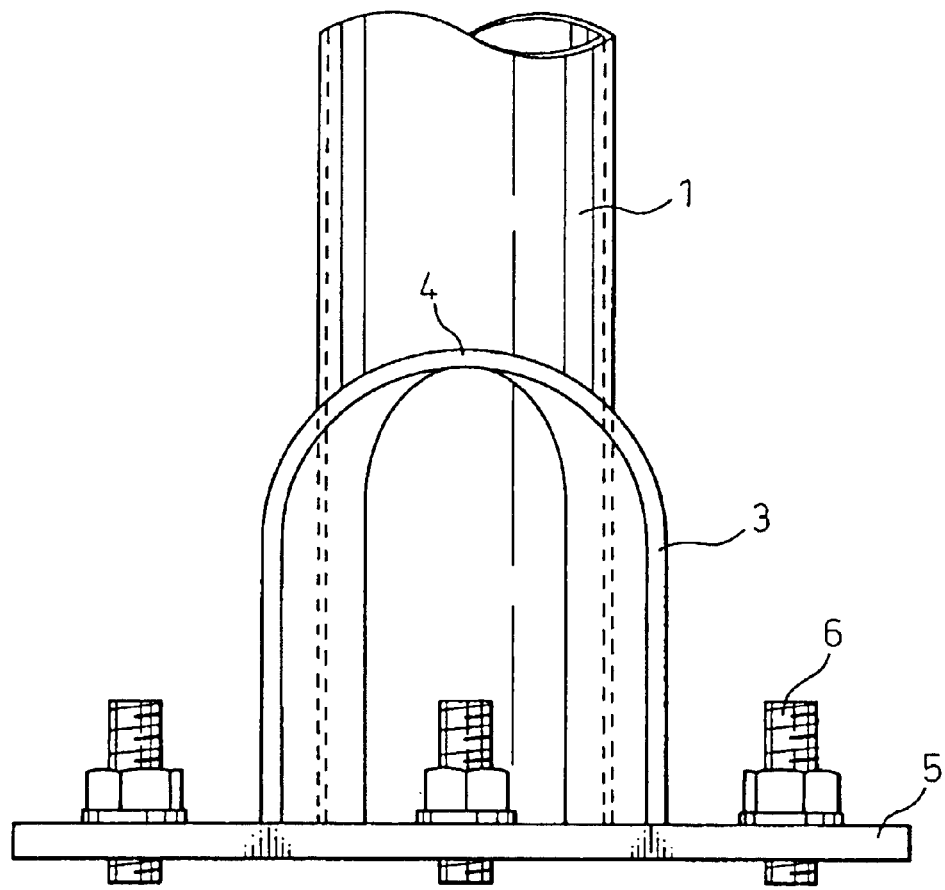
FIG. 26 is a front elevation view of the joining structure shown in FIG. 6.
Figure 27:
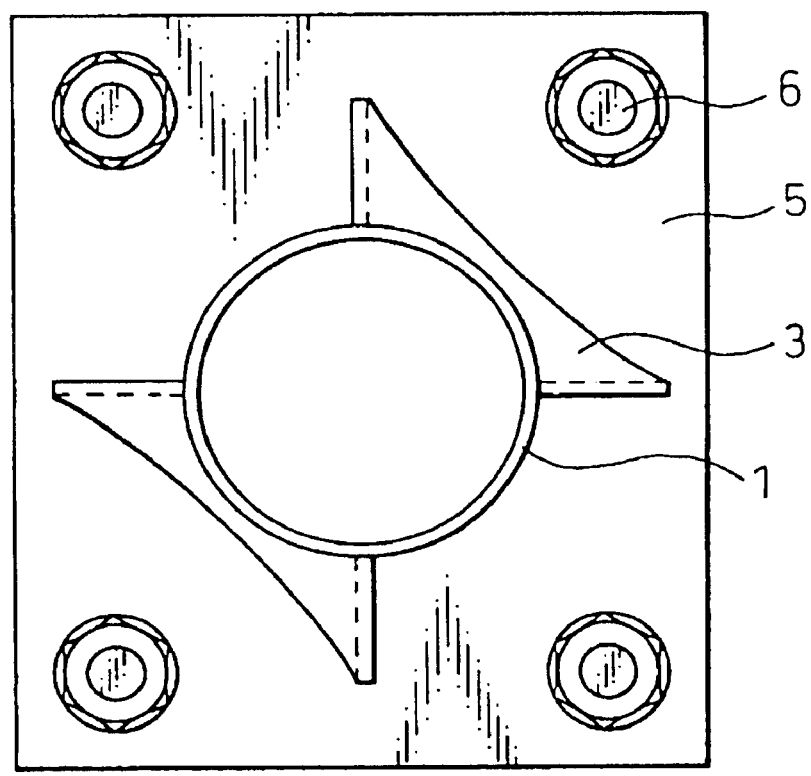
FIG. 27 is a plan view of the joining structure shown in FIG. 6.
Figure 28:
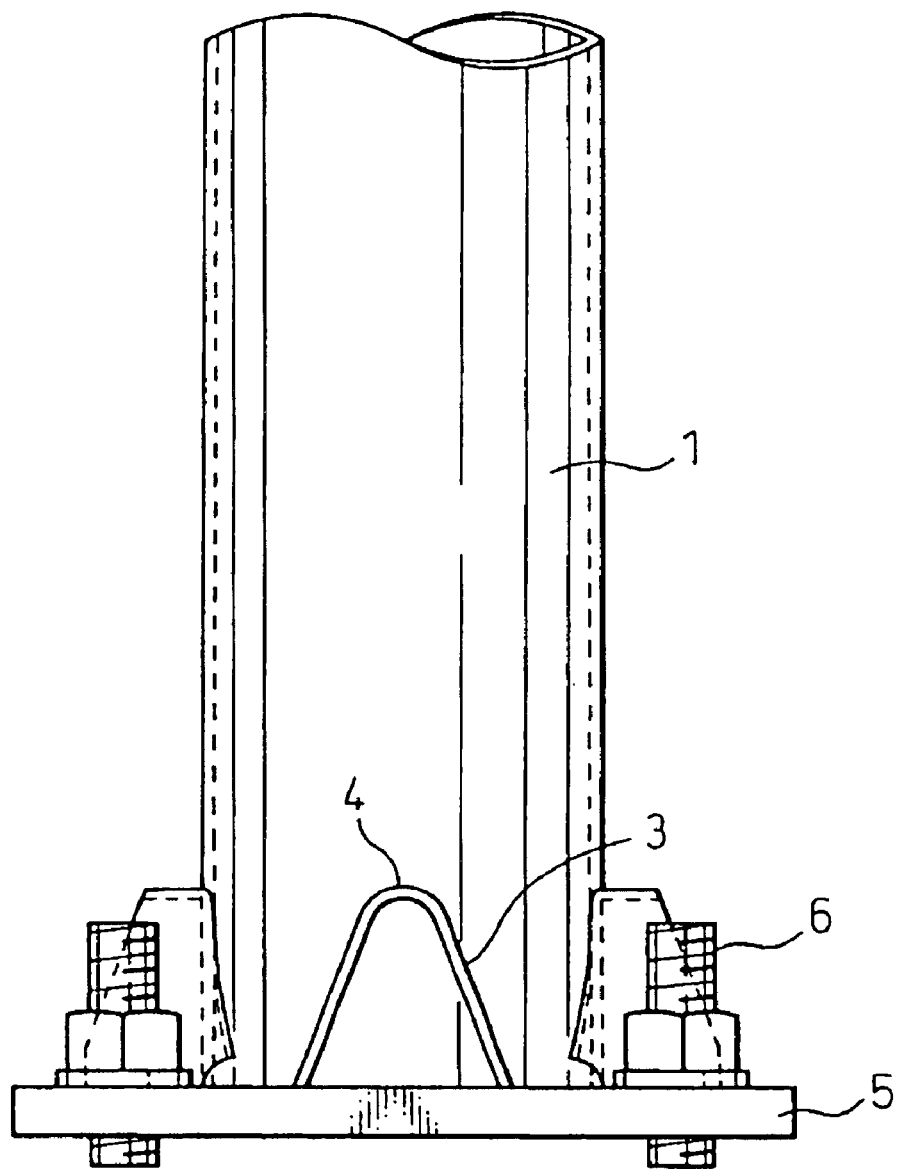
FIG. 28 is a front elevation view of the joining structure shown in FIG. 7.
Figure 29:
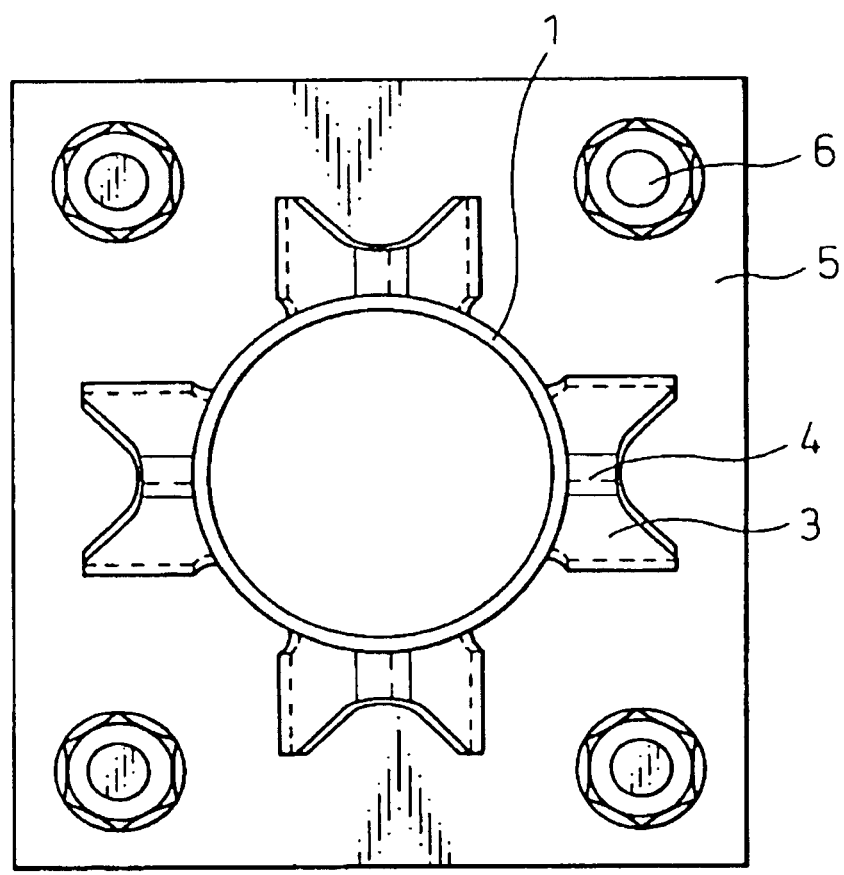
FIG. 29 is a plan view of the joining structure shown in FIG. 7.
Figure 30:
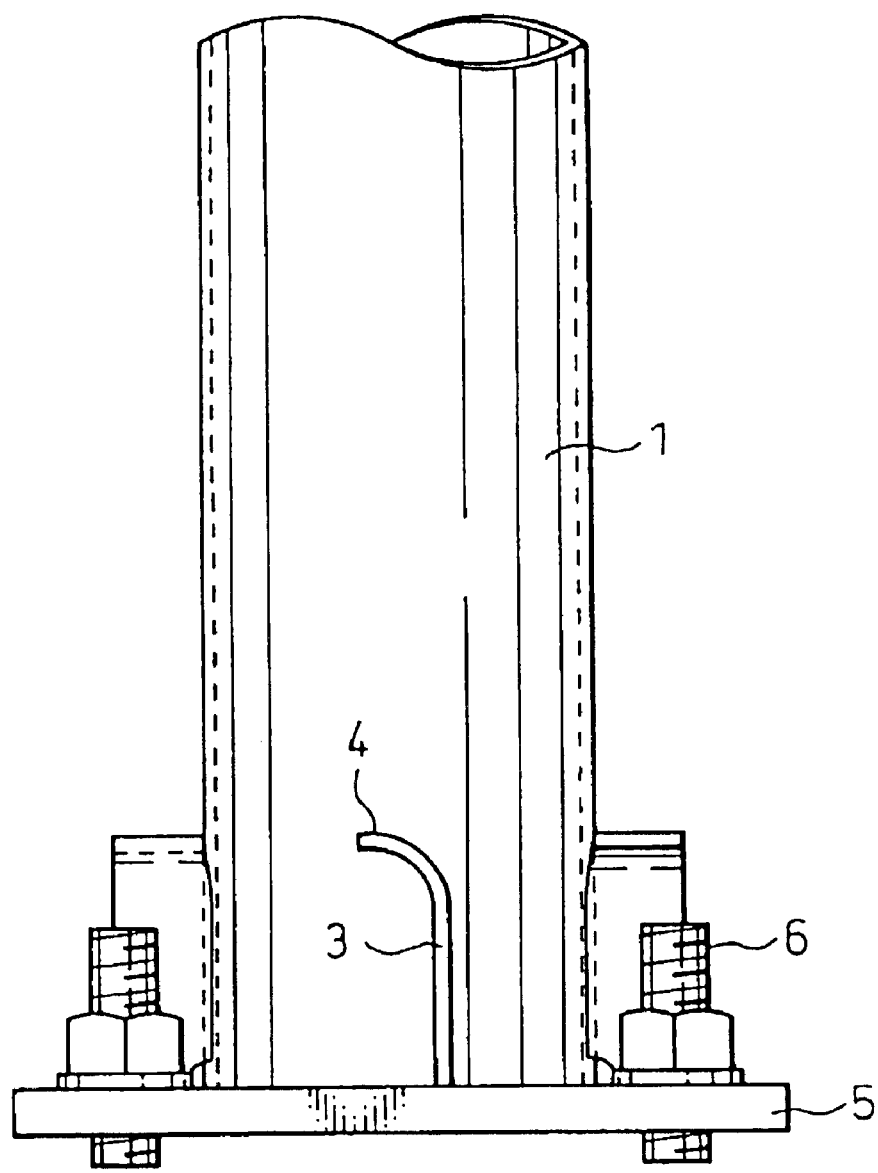
FIG. 30 is a front elevation view of the joining structure shown in FIG. 8.
Figure 31:
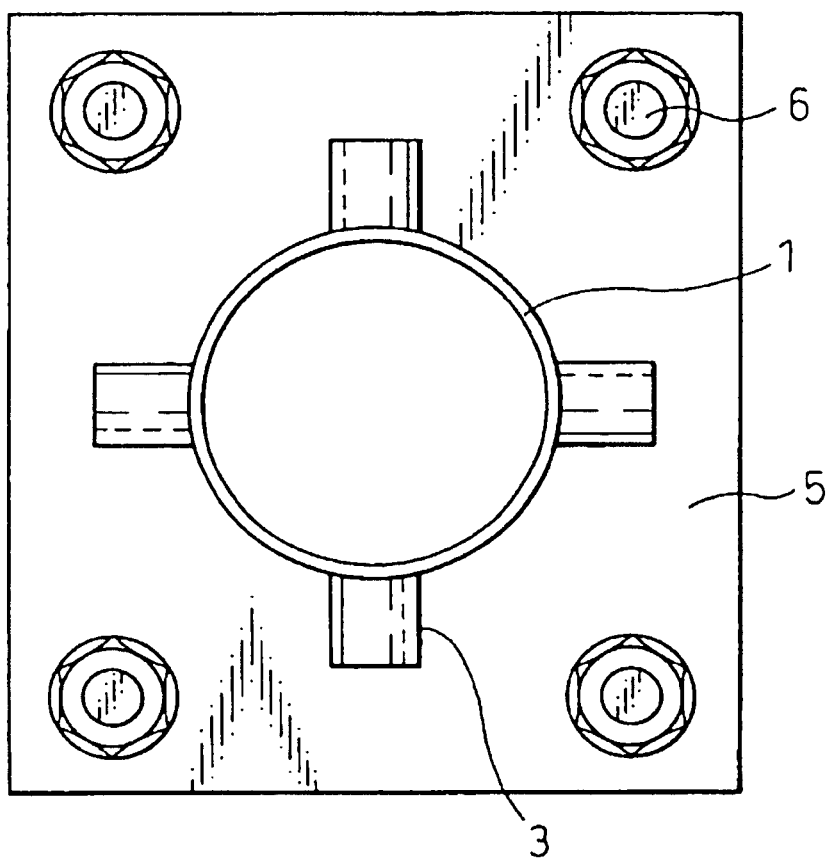
FIG. 31 is a plan view of the joining structure shown in FIG. 8.

Two kinds of test pieces, one according to a conventional technology and the other to the present invention, were prepared for the test. The test pieces according to the conventional technology were structured as shown in FIG. 22, wherein a steel pipe 1 m in length was fixed upright onto a base plate 22 mm in thickness and its base portion was reinforced with conventional vertical ribs. The test pieces according to the present invention were structured as shown in FIG. 2, wherein a steel pipe 1 m in length was fixed upright onto a base plate 22 mm in thickness and its base portion was reinforced with U-shaped reinforcing ribs. $Co_2$ gas shielded arc welding was employed for all the welding work, and the steel grade of all the steel sheets used for the test was Japanese Industrial Standard SM400.

Figure 21:
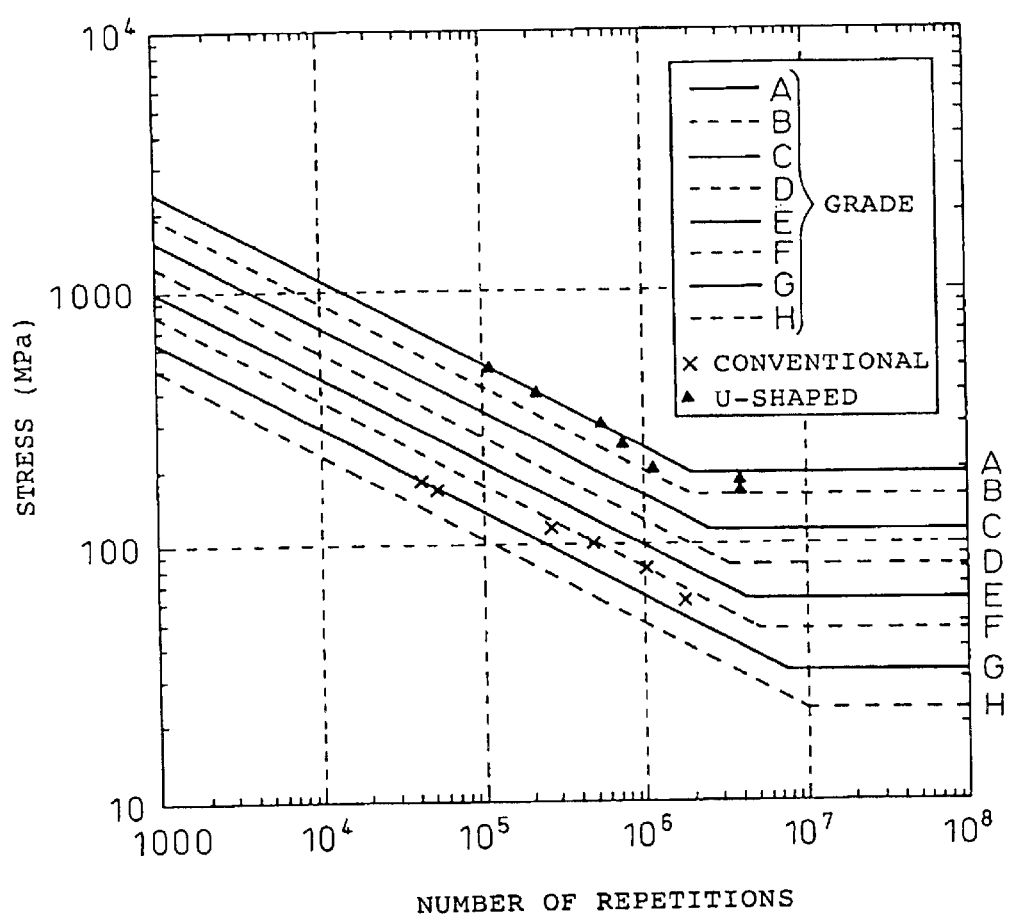
FIG. 21 is a graph of the S-N curves showing the results of the fatigue strength test described in Example.

The fatigue strength of each test piece under a bending load imposed on the steel pipe was measured by a known method. The results are shown in FIG. 21. As seen in the figure, whereas the measurements of the test pieces according to the conventional technology were in the level of Grade G of the design service life curves defined in the design specification of railway bridges, the measurements of those according to the present invention corresponded to Grades A to B. Thus, it was confirmed that the fatigue strength was significantly improved by employing the structure according to the present invention.

INDUSTRIAL APPLICABILITY

As explained above, by the present invention, the stress concentration and residual stress caused by welding heat occurring at a toe of a tabular member in a joining structure can be significantly alleviated and, as a result, the proof stress and fatigue property of the joining structure can be greatly improved compared with a conventional joining structure. The present invention, therefore, can greatly contribute to improving the reliability of a joining structure in widely varied uses, as shown in the embodiments of a present invention, including the anchoring structure of a steel pole base such as an illumination pole and the like.

What is claimed is:

1. A joining structure that is reinforced by welding a columnar structural member to a base plate or a coupling flange via reinforcing ribs, characterized in that: said reinforcing ribs are tabular members gradually bent into a shape of U along the surface of said columnar structural member with said reinforcing ribs located entirely external to the surface of said columnar structural member; and said gradually bent portions having the shape of U protrude from the surface of said columnar structural member in a manner in which said gradually bent portions are located at a first end of said reinforcing ribs opposite to said base plate or coupling flange and a second end of said reinforcing ribs opposite to said first end is located adjacent to said base plate or coupling flange, wherein said reinforcing ribs are welded to both said columnar structural member and to said base plate or coupling flange.

2. A joining structure that is reinforced by welding a columnar structural member to a base plate or a coupling flange via reinforcing ribs, characterized in that: said reinforcing ribs are tabular members gradually bent into a shape of V along the surface of said columnar structural member with said reinforcing ribs located entirely external to the surface of said columnar structural member; and said gradually bent portions having the shape of V protrude from the surface of said columnar structural member in a manner in which said gradually bent portions are located at a first end of said reinforcing ribs opposite to said base plate or coupling flange and a second end of said reinforcing ribs opposite to said first end is located adjacent to said base plate or coupling flange, wherein said reinforcing ribs are welded to both said columnar structural member and to said base plate or coupling flange.

3. A joining structure that is reinforced by welding a structural member to a base plate or a coupling flange via reinforcing ribs, characterized in that: said reinforcing ribs are tabular members gradually bent into a shape of U along the surface of said structural member with said reinforcing ribs located entirely external to the surface of said structural member; and said gradually bent portions having the shape of U protrude from the surface of said structural member in a manner in which said gradually bent portions are located at a first end of said reinforcing ribs opposite to said base plate or coupling flange and a second end of said reinforcing ribs opposite to said first end is located adjacent to said base plate or coupling flange, wherein said reinforcing ribs are welded to both said structural member and to said base plate or coupling flange.

4. A joining structure that is reinforced by welding a structural member to a base plate or a coupling flange via reinforcing ribs, characterized in that: said reinforcing ribs are tabular members gradually bent into a shape of V along the surface of said structural member with said reinforcing ribs located entirely external to the surface of said structural member; and said gradually bent portions having the shape of V protrude from the surface of said structural member in a manner in which said gradually bent portions are located at a first end of said reinforcing ribs opposite to said base plate or coupling flange and a second end of said reinforcing ribs opposite to said first end is located adjacent to said base plate or coupling flange, wherein said reinforcing ribs are welded to both said structural member and to said base plate or coupling flange.

5. A steel pole having a base plate or coupling flange located at least at one end of said steel pole;

an anchoring structure connecting said steel pole to said base plate or coupling flange;

wherein said anchoring structure comprises a joining structure according to claim 3.

6. A steel pole having a base plate or coupling flange locate at least at one end of said steel pole;

an anchoring structure connecting said steel pole to said base plate or coupling flange;

wherein said anchoring structure comprises a joining structure according to claim 4.

* * * * *